(12) United States Patent
Hirano et al.

(10) Patent No.: US 10,968,850 B2
(45) Date of Patent: Apr. 6, 2021

(54) CONTROL DEVICE FOR INTERNAL COMBUSTION ENGINE HAVING PRESSURE INCREASING DEVICE

(71) Applicant: Toyota Jidosha Kabushiki Kaisha, Toyota (JP)

(72) Inventors: Takahiro Hirano, Susono (JP); Mao Hosoda, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 302 days.

(21) Appl. No.: 15/938,519

(22) Filed: Mar. 28, 2018

(65) Prior Publication Data

US 2018/0291829 A1  Oct. 11, 2018

(30) Foreign Application Priority Data

Apr. 6, 2017 (JP) .................... 2017-075931

(51) Int. Cl.
| | |
|---|---|
| *F02D 41/14* | (2006.01) |
| *F02D 41/38* | (2006.01) |
| *F02D 41/40* | (2006.01) |
| *F02D 41/24* | (2006.01) |
| *F02M 47/00* | (2006.01) |

(52) U.S. Cl.
CPC ..... *F02D 41/1406* (2013.01); *F02D 41/2464* (2013.01); *F02D 41/3836* (2013.01); *F02D 41/3845* (2013.01); *F02D 41/401* (2013.01); *F02M 47/00* (2013.01); *F02D 41/2467* (2013.01); *F02D 2041/389* (2013.01); *F02D 2200/0602* (2013.01);

(Continued)

(58) Field of Classification Search
CPC .. F02D 41/2464; F02D 41/2467; F02D 41/38; F02D 41/3836; F02D 41/3845; F02D 41/40; F02D 41/401; F02D 2041/389
USPC ............... 701/104; 123/457, 458; 73/114.43, 73/114.48, 114.51
See application file for complete search history.

(56) References Cited

U.S. PATENT DOCUMENTS 5,176,122 A * 1/1993 Ito .................. F02D 41/2438
123/447
6,557,530 B1 * 5/2003 Benson ............... F02D 41/22
123/447

(Continued)

FOREIGN PATENT DOCUMENTS

| EP | 1452711 A2 | 9/2004 |
|---|---|---|
| JP | 2004-263617 A | 9/2004 |

(Continued)

*Primary Examiner* — Erick R Solis
*Assistant Examiner* — Robert A Werner
(74) *Attorney, Agent, or Firm* — Dinsmore & Shohl LLP

(57) ABSTRACT

A control device for an internal combustion engine includes a fuel injector configured to inject fuel, a pressure increasing device that is provided upstream of the feel injector and is configured to increase the pressure of fuel supplied to the fuel injector, and an electronic control unit. The electronic control unit is configured to calculate an actual fuel injection amount based on a difference between a fuel pressure in the fuel injector in a case where the pressure increasing device increases the fuel pressure without fuel injection by the fuel injector and a fuel pressure in the fuel injector in a case where the fuel injector performs fuel injection according to the driving of the pressure increasing device.

15 Claims, 18 Drawing Sheets

(52) U.S. Cl.
    CPC .............. *F02D 2200/0616* (2013.01); *F02D 2200/0618* (2013.01); *F02D 2200/101* (2013.01)

(56) References Cited

U.S. PATENT DOCUMENTS

| | | | | |
|---|---|---|---|---|
| 2003/0213470 A1* | 11/2003 | Kohketsu | ............ | F02D 41/3836 123/447 |
| 2003/0233998 A1* | 12/2003 | Futonagane | ........ | F02D 41/3836 123/299 |
| 2007/0089710 A1* | 4/2007 | Watanabe | ............ | F02M 57/025 123/446 |
| 2009/0326788 A1* | 12/2009 | Yuasa | ................. | F02D 41/3809 701/104 |
| 2016/0195033 A1* | 7/2016 | Imhof | .................... | F02D 41/30 701/104 |
| 2017/0363036 A1* | 12/2017 | Okamoto | ............ | F02D 41/0085 |
| 2018/0100419 A1* | 4/2018 | Suzuki | ................. | F01N 3/0814 |

FOREIGN PATENT DOCUMENTS

| | | | |
|---|---|---|---|
| JP | 2005-248722 A | 9/2005 |
| JP | 2011-007203 A | 1/2011 |
| JP | 2012002180 A | 1/2012 |

* cited by examiner

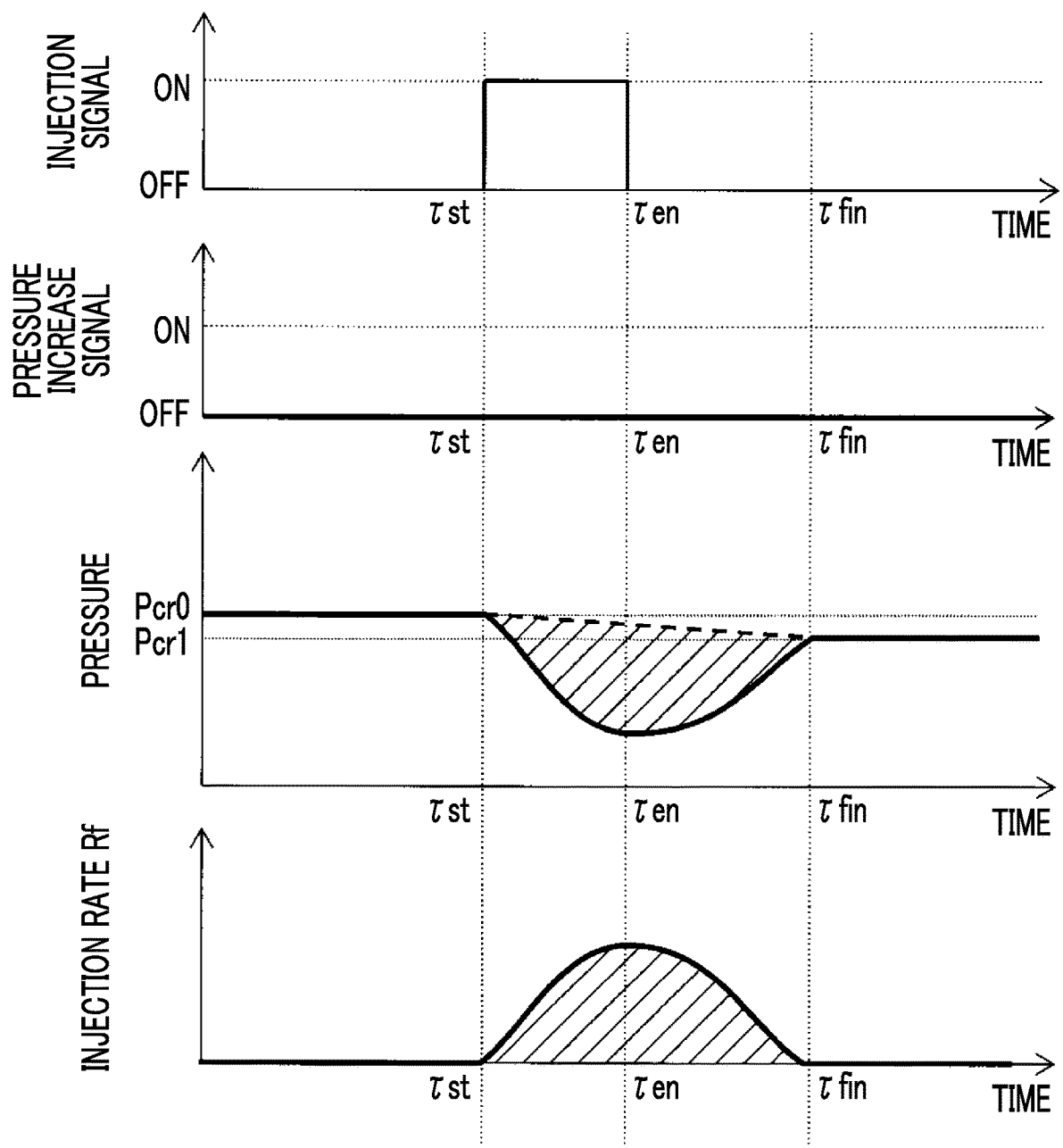

CONTROL DEVICE FOR INTERNAL COMBUSTION ENGINE HAVING PRESSURE INCREASING DEVICE

CROSS-REFERENCE TO RELATED APPLICATIONS

This application claims priority to Japanese Patent Application No. 2017-075931 filed on Apr. 6, 2017, which is incorporated herein by reference in its entirety including the specification, drawings and abstract.

BACKGROUND

1. Technical Field

The present disclosure relates to a control device for an internal combustion engine.

2. Description of Related Art

As a control device for as internal combustion engine in the related art, Japanese Unexamined Patent Application Publication No. 2005-248722 (JP 2005-243722 A) discloses a control device configured to control the fuel injection pressure in an internal combustion engine in which fuel supplied from a common rail is injected by an injector after the fuel pressure is further increased by a pressure increasing device. JP 2003-248722 A discloses that the fuel injection characteristic is corrected by comparing the fuel pressure measured by the injector with the fuel pressure obtained by simulation.

Japanese Unexamined Patent Application Publication No. 2011-007203 (JP 2011-007203 A) discloses that a temporal change in a fuel injection amount (that is, an injection rate) is measured based on the temporal change of a pressure decrease in an injector caused by fuel injection for an internal combustion engine not using a pressure increasing device.

The amount of pressure decrease, in the injector is obtained by subtracting the fuel pressure in the injector during fuel injection from the pressure of fuel supplied to the injector before fuel injection. Since there is a correlation between the injection rate and the temporal change of the pressure decrease in the injector obtained as described above, the injection rate can be calculated.

SUMMARY

Incidentally, in the internal combustion engine including the pressure increasing device, the pressure of fuel supplied to the injector changes due to the driving of the pressure increasing device. Therefore, the temporal change of the pressure decrease in the injector cannot be calculated unless the temporal change in the fuel pressure due to the driving of the pressure increasing device is known. For this reason, the fuel injection amount cannot be calculated by applying the method disclosed in JP 2011-007203 A for the internal combustion engine including a pressure increasing device.

An aspect of the present disclosure relates to a control device for an internal combustion engine. The control device includes a fuel injector configured to inject fuel, a pressure increasing device that is provided upstream of the fuel injector and is configured to increase the pressure of fuel supplied to the fuel injector, and an electronic control unit. The electronic control unit is configured to calculate an actual fuel injection amount based on a difference between a first fuel pressure in the fuel injector when the pressure increasing device increases the fuel pressure without fuel injection by the fuel injector and a second fuel pressure in the fuel injector when the fuel injector performs fuel injection while driving of the pressure increasing device.

According to the aspect of the present disclosure, the fuel injection amount can also be calculated for the internal combustion engine including a pressure increasing device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a timing chart in a case where fuel is injected without increasing the fuel pressure;

DETAILED DESCRIPTION OF EMBODIMENTS

First Embodiment

Figure 1:
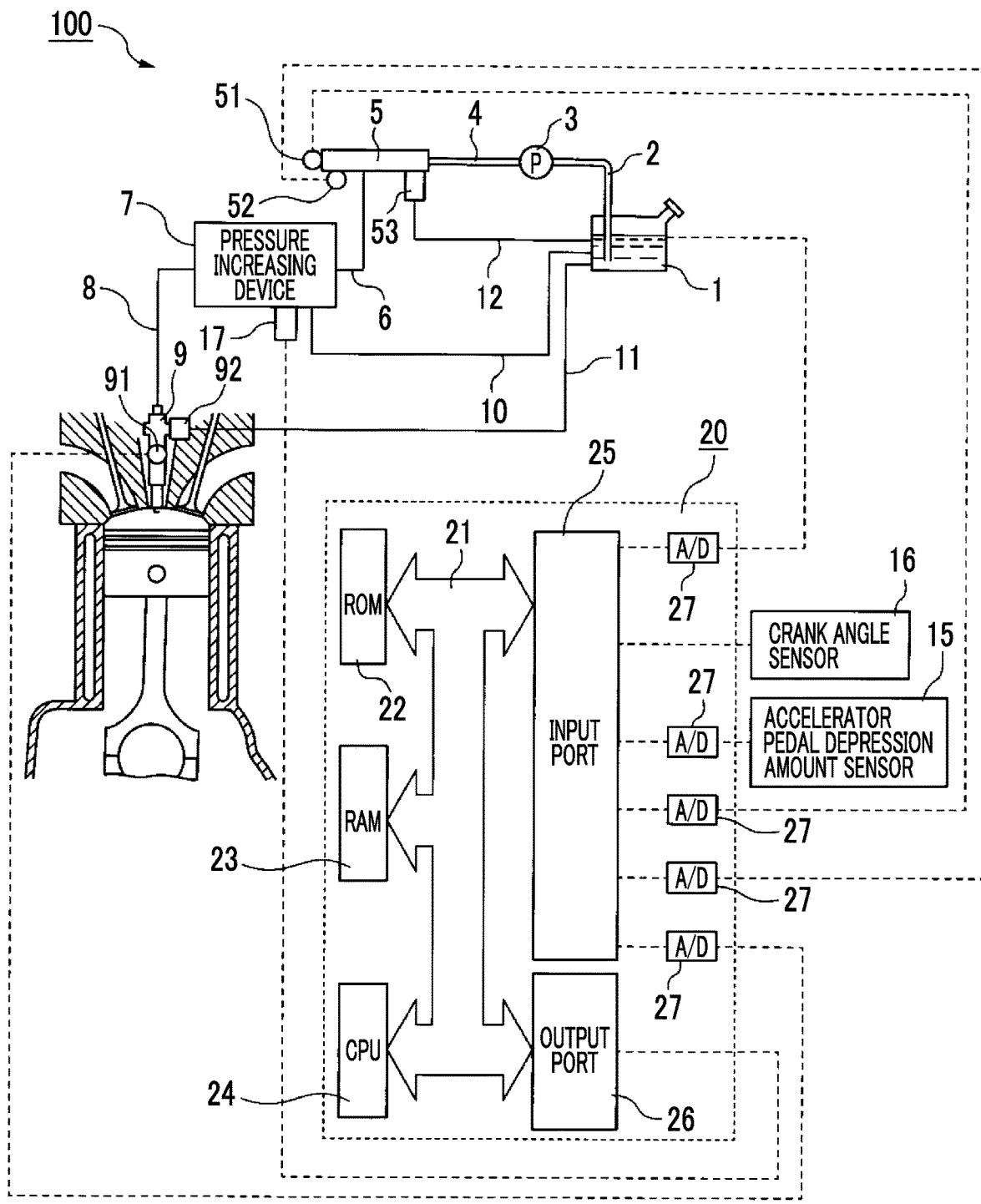
FIG. 1 is a schematic diagram showing an internal combustion engine of a first embodiment of the present disclosure.

FIG. 1 is a schematic configuration diagram of an internal combustion engine 100 according to a first embodiment of the present disclosure and an electronic control unit 20 that controls the internal combustion engine 100.

The internal combustion engine 100 according to the present embodiment includes a fuel tank 1, a pump suction passage 2, a supply pump 3, a pump discharge passage 4, a common rail 5, a supply passaged 6, a pressure increasing device 7, an injection passage 8, an injector 9, a return passage 10, and a relief passage 11.

The fuel tank 1 stores fuel supplied from the outside at atmospheric pressure. The fuel stored in the fuel tank 1 is sucked up by the supply pump 3 through the pump suction passage 2.

The supply pump 3 sucks up the fuel stored in the fuel tank 1, and increases the fuel pressure. The fuel having a pressure that has been increased by the supply pump 3 is supplied to the common rail 5 through the pump discharge passage 4. The amount of fuel discharged from the supply pump 3 can be controlled by the electronic control unit 20, and the fuel pressure in the common rail 5 is controlled by controlling the amount of fuel discharged from the supply pump 3.

The common rail 5 holds the fuel, which is supplied from the supply pump 3 through the pump discharge passage 4, in a high pressure state. The common rail 5 is connected to a plurality of supply passages 6 corresponding to respective cylinders, and distributes fuel to each cylinder. The common rail 5 includes a common rail pressure sensor 51 for measuring the pressure of fuel held in the common rail 5. In the following description, the fuel pressure in the common rail 5 will be referred to as a common rail pressure Pcr.

The pressure increasing device 7 is provided corresponding to each cylinder, and further increases the pressure of fuel supplied from the common rail 5 through the supply passage 6 and supplies the fuel to the injector 9 through the injection passage 8. An actuator 17 for driving the pressure increasing device 7 is provided in the pressure increasing device 7. When a signal is transmitted from the electronic control unit 20 (which will be described later) to the actuator 17, the actuator 17 is driven so that the pressure increasing device 7 increases the fuel pressure. As the pressure increasing device 7 discharges the fuel having a pressure that has been increased toward the injector 9, the pressure increasing device 7 discharges fuel having a pressure that has not been increased to the fuel tank 1 through the return passage 10.

The injector 9 is provided corresponding to each cylinder, and injects the fuel supplied from the pressure increasing device 7 through the injection passage 8 to the cylinder. The amount of fuel injected into the cylinder (fuel injection amount) increases as the pressure of fuel supplied to the injector 9 increases in a case where the valve opening time of the injector 9 is the same. Therefore, in the present embodiment, in order to control the fuel injection amount, the pressure of fuel supplied to the injector 9 is controlled. For this reason, an injection pressure sensor 91 for measuring the pressure of fuel supplied to the injector 9 is provided in the injector 9. In the following description, the fuel pressure in the injector 9 will be referred to as a fuel injection pressure Pinj.

In addition, a relief valve 92 for returning the fuel to the fuel tank 1 through the relief passage 11 in a case where the fuel pressure becomes too high is provided in the injector 9. The relief valve 92 is provided between the inside of the injector 9 and the relief passage 11, and is opened in a case where the fuel pressure of the injector 9 becomes higher than the predetermined fuel pressure, so that the fuel in the injector 9 is discharged toward the fuel tank 1.

The electronic control unit 20 is a digital computer, and includes a ROM 22, a RAM 23, a CPU 24, an input port 25, and an output port 26 that are connected to each other by a bidirectional bus 21.

Analog signals from the common rail pressure sensor 51, the injection pressure sensor 91, and the like are input to the input port 25 after being converted into digital signals through corresponding AD converters 27. An analog signal from an accelerator pedal depression amount sensor 15 that detects the depression amount of an accelerator pedal in order to detect the load of the internal combustion engine 100 is input to the input port 25 after being converted into a digital signal through the AD converter 27. A digital signal output from a crank angle sensor 16 for detecting the rotation speed of the crankshaft is input to the input port 25. As described above, output signals of various sensors needed to control the internal combustion engine 100 are input to the input port 25. The output port 26 is connected to the supply pump 3, the pressure increasing device 7, the injector 9, and the like, and outputs a digital signal calculated by the CPU 24.

Figure 2A:
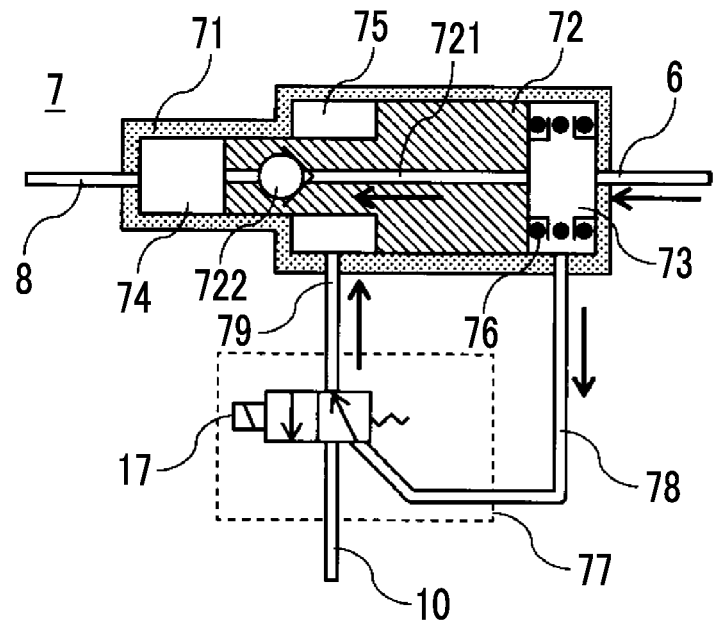
FIG. 2A is a schematic diagram showing the state of a pressure increasing device before pressure increase.
Figure 2B:
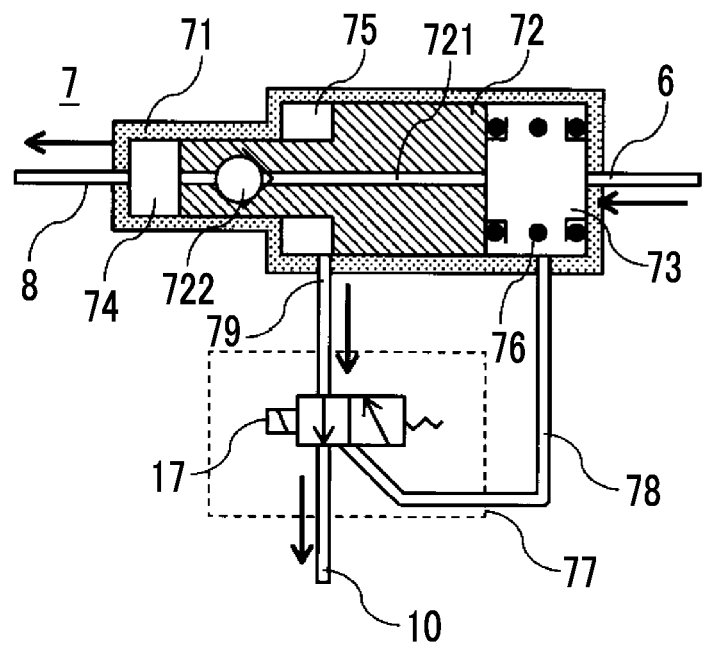
FIG. 2B is a schematic diagram showing the state of the pressure increasing device after pressure increase.

The configuration of the pressure increasing device 7 will be described with reference to FIGS. 2A and 2B. FIG. 2A is a schematic diagram showing the state of the pressure increasing device 7 before the fuel pressure is increased by the pressure increasing device 7. FIG. 2B is a schematic diagram showing a state in which the pressure increasing device 7 increases the fuel pressure and discharges the fuel toward the injector 9.

As shown in FIG. 2A, the pressure increasing device 7 includes a housing 71, a piston 72, a piston chamber 73, a pressure increasing chamber 74, a pressure increase control chamber 75, a spring 76, a three-way valve 77, a first three-way valve passage 78, and a second three-way valve passage 79. The arrows in FIGS. 2A and 2B indicate a direction in which fuel flows.

The inside of the housing 71 is filled with fuel. In the present embodiment, the supply passage 6 is connected to a first end (right side in the diagram) of the housing 71 in the longitudinal direction and the injection passage 8 is connected to a second end (left side in the diagram) of the housing 71, and the fuel supplied to the inside of the housing 71 through the supply passage 6 is discharged from the injection passage 8. In the following description, the right side of FIG. 2A or 2B will be referred to as a supply passage 6 side, and the left side of FIG. 2A or 2B will be referred to as an injection passage 8 side. The housing 71 has a shape obtained by connecting two cylinders having different inner diameters, and the inner diameter of the cylinder on the supply passage 6 side is larger than the inner diameter of the cylinder on the injection passage 8 side. Hereinafter, the cylinder on the supply passage 6 side will be referred to as a "large diameter portion of the housing 71", the inner peripheral surface of the large diameter portion of the housing 71 will be referred to as a "large diameter inner peripheral surface of the housing 71", the cylinder on the injection passage 8 side will be referred to as a "small diameter portion of the housing 71", and the inner peripheral surface of the small diameter portion of the housing 71 will be referred to as a "small diameter inner peripheral surface of the housing 71".

The piston 72 is housed in the housing 71 so as to be movable in the housing 71 along the longitudinal direction of the housing 71.

The piston 72 has a shape obtained by connecting two cylinders having different diameters, and the diameter of the cylinder on the supply passage 6 side is larger than the diameter of the cylinder on the injection passage 8 side. Hereinafter, the cylinder on the supply passage 6 side will be referred to as a "large diameter portion of the piston 72", the outer peripheral surface of the large diameter portion of the piston 72 will be referred to as a "large diameter outer peripheral surface of the piston 72", the cylinder on the injection passage 8 side will be referred to as a "small diameter portion of the piston 72", and the outer peripheral surface of the small diameter portion of the piston 72 will be referred to as a "small diameter outer peripheral surface of the piston 72".

The piston chamber 73 disposed on the supply passage 6 side, the pressure increasing chamber 74 disposed on the injection passage 8 side, and the pressure increase control chamber 75 disposed between the piston chamber 73 and the pressure increasing chamber 74 are formed inside the housing 71 by the piston 72 and the housing 71.

The piston 72 includes a piston inner passage 721 provided so as to pass through the piston 72 in the longitudinal direction and a check valve 722 provided in the piston inner passage 721. The check valve 722 allows fuel to flow into the piston inner passage 721 toward the pressure increasing chamber 74 from the piston chamber 73, and restricts the flow of fuel from the pressure increasing chamber 74 toward the piston chamber 73 through the piston inner passage 721.

The piston chamber 73 is a space formed by the end surface of the large diameter portion of the housing 71, the large diameter inner peripheral surface of the housing 71, and the end surface of the large diameter portion of the piston 72. The piston chamber 73 is filled with high pressure fuel that is supplied from the common rail 5 through the supply passage 6. The spring 76 is provided in the piston chamber 73 so as to generate a tension that always pulls the piston 72 toward the supply passage 6 side.

The pressure increasing chamber 74 is a space formed by the small diameter inner peripheral surface of the housing 71, the end surface of the small diameter portion of the housing 71, and the end surface of the small diameter portion of the piston 72. The pressure increasing chamber 74 is connected to the piston chamber 73 through the piston inner passage 721, so that the fuel in the piston chamber 73 is supplied to the pressure increasing chamber 74. The pressure increasing chamber 74 is also connected to the injection passage 8.

The pressure increase control chamber 75 is provided between the piston chamber 73 and the pressure increasing chamber 74, and is a space defined by the large diameter inner peripheral surface of the housing 71 and the small diameter outer peripheral surface of the piston 72.

The pressure increase control chamber 75 is selectively connected to the common rail 5 or the fuel tank 1. The pressure increase control chamber 75 and the common rail 5 do not necessarily need to be directly connected to each other as long as the fuel in the common rail 5 is supplied to the pressure increase control chamber 75. Similarly, the pressure increase control chamber 75 and the fuel tank 1 do not necessarily need to be directly connected to each other as long as the fuel in the pressure increase control chamber 75 can be discharged to the fuel tank 1. In the present embodiment, the pressure increase control chamber 75 is connected to the common rail 5 through the second three-way valve passage 79, the first three-way valve passage 78, the piston chamber 73, and the supply passage 6, and the pressure increase control chamber 75 is connected to the fuel tank 1 through the second three-way valve passage 79 and the return passage 10.

As shown in FIG. 2A, when the pressure increase control chamber 75 is connected to the common rail 5, the high pressure fuel from the common rail 5 is supplied to the pressure increase control chamber 75. On the other hand, as shown in FIG. 2B, when the pressure increase control chamber 75 is connected to the fuel tank 1, the fuel in the pressure increase control chamber 75 is discharged to the fuel tank 1, and the fuel pressure in the pressure increase control chamber 75 is reduced.

In the present embodiment, the three-way valve 77 is a spool type solenoid valve. By driving the three-way valve 77 with the actuator 17 provided in the three-way valve 77, the pressure increasing device 7 is switched between a state in which the pressure increase control chamber 75 and the common rail 5 are connected to each other (FIG. 2A) and a state in which the pressure increase control chamber 75 and the fuel tank 1 are connected to each other (FIG. 2B). The actuator 17 is controlled by the signal output from the electronic control unit 20.

Figure 3A:
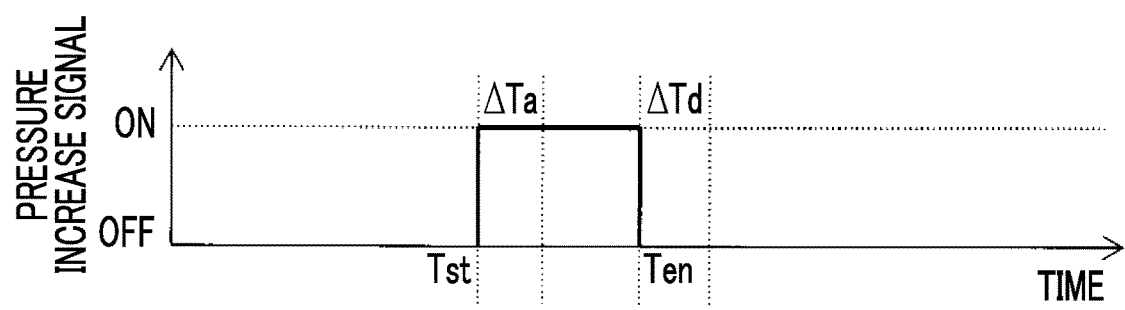
FIG. 3A is a timing chart showing a temporal change of a pressure increase signal that an electronic control unit outputs to the pressure increasing device.
Figure 3B:
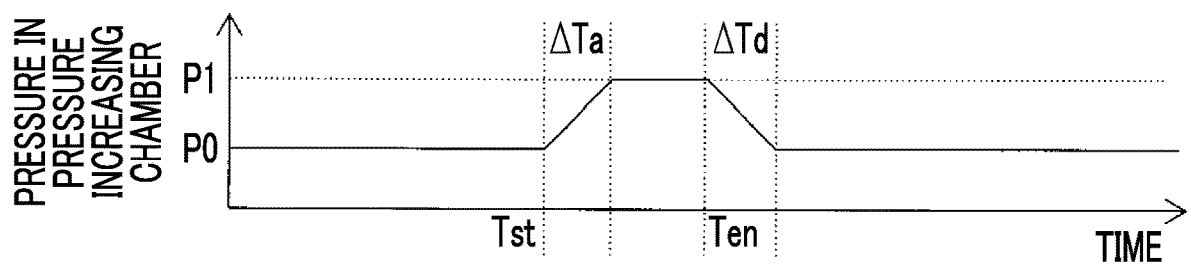
FIG. 3B is a timing chart showing a temporal change in the pressure of fuel discharged from the pressure increasing chamber in the pressure increasing device.

The operation of the pressure increasing device 7 will be described with reference to FIGS. 2A to 3B. FIG. 3A is a timing chart showing a temporal change of a signal transmitted from the electronic control unit 20 to the pressure increasing device 7, and FIG. 3B is a timing chart showing a temporal change in the pressure of fuel discharged from the pressure increasing device 7 toward the injector 9.

First, in the initial state (state before time Tst), as shown in FIG. 2A, the three-way valve 77 connects the common rail 5 and the pressure increase control chamber 75 to each other through the supply passage 6. At this time, high pressure fuel is supplied from the common rail 5 to the piston chamber 73 and the pressure increase control chamber 75. As a result, the fuel pressure of the piston chamber 73 and the fuel pressure of the pressure increase control chamber 75 are balanced. The piston 72 is disposed on the supply passage 6 side by the tension of the spring 76 disposed in the piston chamber 73.

Then, at time Tst, the electronic control unit 20 switches a pressure increase signal, which is a signal for driving the pressure increasing device 7, from OFF to ON to drive the actuator 17. When the pressure increase signal is turned on, the pressure increase control chamber 75 is connected to the fuel tank 1 through the return passage 10. Accordingly, the fuel in the pressure increase control chamber 75 is discharged to the fuel tank 1, and the fuel pressure in the pressure increase control chamber 75 is reduced. As a result, the fuel pressure in the piston chamber 73 becomes higher than the fuel pressure in the pressure increase control chamber 75, so that the fuel filled in the piston chamber 73 applies a force in a direction in which the piston 72 is pushed toward the injection passage 8 side and the piston 72 starts to move toward the injection passage 8 side.

As shown in FIG. 2B, when the piston 72 starts to move to the injection passage 8 side, the volume of the pressure increasing chamber 74 is reduced and the fuel filled in the pressure increasing chamber 74 is discharged to the injection passage 8. Since the sectional area S0 of the large diameter portion of the piston 72 is larger than the sectional area S1 of the small diameter portion of the piston 72, the fuel pressure P1 of the pressure increasing chamber 74 is increased to S0/S1 times the fuel pressure P0 of the piston chamber 73 based on the Pascal's principle. In the following description, the ratio S0/S1 of the fuel pressure will be referred to as a pressure increase ratio α. For example, in the present embodiment, the pressure increase ratio α is 2. Since the check valve 722 is provided in the piston inner passage 721, fuel hardly flows back to the piston chamber 73 as the pressure increasing chamber 74 contracts.

Incidentally, the pressure of fuel discharged to the injection passage 8 is not multiplied by α when the piston 72 starts to move to the injection passage 8 side, and the pressure of fuel discharged to the injection passage 8 gradually increases with the passage of time. That is, the piston 72 gradually accelerates with the passage of time after the piston 72 starts to move to the injection passage 8 side, and the pressure of fuel discharged from the injection passage 8 increases with the acceleration of the piston 72. After a while, the acceleration of the piston 72 ends, and the piston 72 moves at a constant speed toward the injection passage 8. The pressure of the fuel discharged from the injection passage 8 while the piston 72 is moving at a constant speed as described above becomes α times the pressure of fuel supplied to the piston chamber 73. Hereinafter, the time until the pressure of fuel discharged to the injection passage 8 becomes α times the pressure of fuel supplied to the piston chamber 73 after the electronic control unit 20 switches the pressure increase signal to ON will be referred to as an acceleration response delay ΔTa. The piston 72 changes from the state of FIG. 2A to the state of FIG. 2B in a period from time Tst to time Ten at which the pressure increase signal is switched to OFF.

Then, at time Ten, the electronic control unit 20 switches the pressure increase signal from ON to OFF to stop the supply of power to the actuator 17. After time Ten, since the pressure increase control chamber 75 is connected to the common rail 5 through the piston chamber 73, high pressure fuel is supplied from the common rail 5 to the pressure increase control chamber 75, and the fuel pressure of the pressure increase control chamber 75 is increased. As a result, the force with which the piston 72 pushes out the fuel in the pressure increasing chamber 74 becomes weak, and the pressure of fuel discharged from the pressure increasing chamber 74 decreases with the passage of time. When a certain period of time has passed from time Ten, the deceleration of the piston 72 ends, and the movement toward the injection passage 8 side disappears. As a result, the increase in the fuel pressure in the pressure increasing chamber 74 ends. The pressure of the fuel discharged from the injection passage 8 when the movement of the piston 72 ends becomes equal to the pressure of fuel supplied to the piston chamber 73, that is, the fuel pressure in the common rail 5. Hereinafter, the time until the pressure of fuel discharged to the injection passage 8 becomes equal to the fuel pressure in the common rail 5 after the electronic control unit 20 switches the pressure increase signal OFF will be referred to as a deceleration response delay ΔTd. When, the piston 72 ends the movement toward the injection passage 8 side, the piston 72 becomes closest to the injection passage 8. Accordingly, the pressure increasing device 7 is in the state shown in FIG. 2B.

When a predetermined amount of time elapses after the piston 72 ends the movement toward the injection passage 8 side, the piston 72 is moved to the supply passage 6 side by the tension of the spring 76, and finally, the pressure increasing device 7 returns to the initial state in FIG. 2A. While the piston 72 is moving to the supply passage 6 side, the volume of the pressure increasing chamber 74 increases, and fuel is supplied again from the piston chamber 73 to the pressure increasing chamber 74 through the piston inner passage 721. As described above, the fuel injection pressure can be increased by driving the pressure increasing device 7, that is, reciprocating the piston 72 at each fuel injection-timing.

The temporal change in the pressure of fuel injected from the injector 9 will be described with reference to FIG. 4. FIG. 4 is a timing chart in a case where fuel is injected without increasing the fuel pressure. The graphs in FIG. 4 show, in order from the top, a temporal change of an injection signal transmitted from the electronic control unit 20 to the injector 9 in order to inject fuel, a temporal change of a pressure increase signal transmitted from the electronic control unit 20 to the pressure increasing device 7 in order to increase the fuel pressure, a temporal change in the fuel injection pressure Pinj (solid line) that is the fuel pressure in the injector 9, a temporal change in the common rail pressure Pcr (broken line) that is the fuel pressure in the common rail 5, and a temporal change in the amount of fuel injected from the injector 9 per unit time (hereinafter, referred to as a "fuel injection rate-Rf").

First, the common rail pressure Pcr is assumed to be the value of Pcr0 in a state before time τst in which no fuel is injected. In a state in which no fuel is injected, the injection signal is in the OFF state, and the injector 9 is connected to the common rail 5 through the pressure increasing device 7. Accordingly, the fuel injection pressure Pinj (solid line) and the common rail pressure Pcr (broken line) are the same pressure Pcr0.

At time τst, the electronic control unit 20 switches the injection signal from OFF to ON. At this time, fuel starts to be injected from the injector 9, and the fuel injection rate Rf increases and the fuel injection pressure Pinj and the common rail pressure Pcr decrease with fuel injection.

Changes in the fuel injection pressure Pinj and the common rail pressure Pcr will be described. First, the fuel injection pressure Pinj is subjected to two kinds of action, that is, action in which the fuel injection pressure Pinj is made close to the common rail pressure Pcr by the fuel supplied from the common rail 5 and action in which the fuel in the injector 9 expands to decrease the fuel injection pressure Pinj due to injection of fuel from the injector 9. Therefore, when the fuel injection rate Rf increases, solely the action of decreasing the fuel injection pressure Pinj becomes strong. As a result, the pressure (fuel injection pressure Pinj) of the fuel in the injector 9 decreases. On the other hand, the common rail pressure Pcr gently decreases since the fuel is supplied from the common rail 5 to the injector 9 through the pressure increasing device 7. Assuming that no fuel is supplied from the supply pump 3 to the common rail 5, the volume of fuel in the common rail 5 continues to decrease. Therefore, the common rail pressure Pcr continues to decrease with the passage of time.

As is apparent from FIG. 4, a decrease in the fuel injection pressure Pinj is larger than a decrease in the common rail pressure Pcr. This is because a pressure change increases as the amount of expansion of fuel according to fuel injection increases. For example, since the volume of fuel stored in the injector 9 is smaller than the volume of fuel stored in the common rail 5 and the change in the fuel volume according to fuel injection increases, the change in the fuel injection pressure Pinj is larger than the change in the common rail pressure Pcr.

At time τen, the electronic control unit 20 switches the injection signal from ON to OFF. At this time, since the amount of fuel injected from the injector 9 is reduced to zero, the fuel injection rate Rf starts to decrease. When the fuel injection rate Rf decreases, the action of decreasing the fuel injection pressure Pinj is reduced. Accordingly, the fuel injection pressure Pinj increases toward the common rail pressure Pcr. On the other hand, the common rail pressure Pcr continues to decrease as long as no fuel is supplied from the supply pump 3.

When a certain period of time has passed from time τen, the fuel injection ends and the fuel injection rate Rf becomes zero. Assuming that the common rail pressure Pcr at this time is Pcr1, the fuel injection pressure Pinj becomes the same pressure as the common rail pressure Pcr again. Therefore, the fuel injection pressure Pinj also becomes Pcr1. The time until the fuel injection rate Rf becomes zero from time τen will be hereinafter referred to as an "injection response delay Δτd".

A method of calculating the actual fuel injection amount based on the fuel injection pressure Pinj will be described. When the electronic control unit 20 issues an injection command once, the amount of fuel injected from the injector 9 (hereinafter, referred to as "fuel injection amount Q") cannot be directly measured. Therefore, the fuel injection amount Q is calculated using the fuel injection pressure Pinj. The fuel injection amount Q is an amount obtained by integrating the fuel injection rate Rf, which is the fuel injection amount per unit time, with respect to time. In order to obtain the fuel injection amount Q, the fuel injection rate Rf is calculated first.

As described above, when the fuel injection rate Rf increases, the fuel injection pressure Pinj decreases. Therefore, assuming that the pressure of fuel supplied to the injector 9 is a supply pressure Psup, the fuel injection rate Rf is substantially proportional to a value obtained by subtracting the fuel injection pressure Pinj from the supply pressure Psup. In the example described above, since the supply pressure Psup is the same as the common rail pressure Pcr, the supply pressure Psup is indicated by a broken line in FIG. 4. That is, the fuel injection rate Rf can be calculated from a value obtained by subtracting the fuel injection pressure Pinj from the common rail pressure Pcr.

The fuel injection amount Q is calculated by integrating the fuel injection rate Rf with respect to time. For example, in FIG. 4, the fuel injection amount Q is the area of a hatched region of the graph of the injection rate. Incidentally, the area of the hatched region of the graph of the injection rate is proportional to the area of a region surrounded by the supply pressure Psup (broken line) and the fuel injection pressure Pinj (solid line). Therefore, the fuel injection amount Q can be calculated by calculating the area of the region surrounded by the supply pressure Psup (broken line) and the fuel injection pressure Pinj (solid line).

As described above, in a case where fuel is injected without driving the pressure increasing device 7, the supply pressure Psup is equal to the common rail pressure Pcr. Therefore, the fuel injection amount Q can be calculated from the fuel injection pressure Pinj. However, in a case where fuel is injected while driving the pressure increasing device 7, the supply pressure Psup is not the common rail pressure Pcr and is the pressure of fuel discharged from the pressure increasing device 7. Since the pressure of fuel discharged from the pressure increasing device 7 changes depending on the driving of the pressure increasing device 7, it is difficult to calculate the supply pressure Psup, and it is difficult to calculate the fuel injection amount Q.

Figure 5:
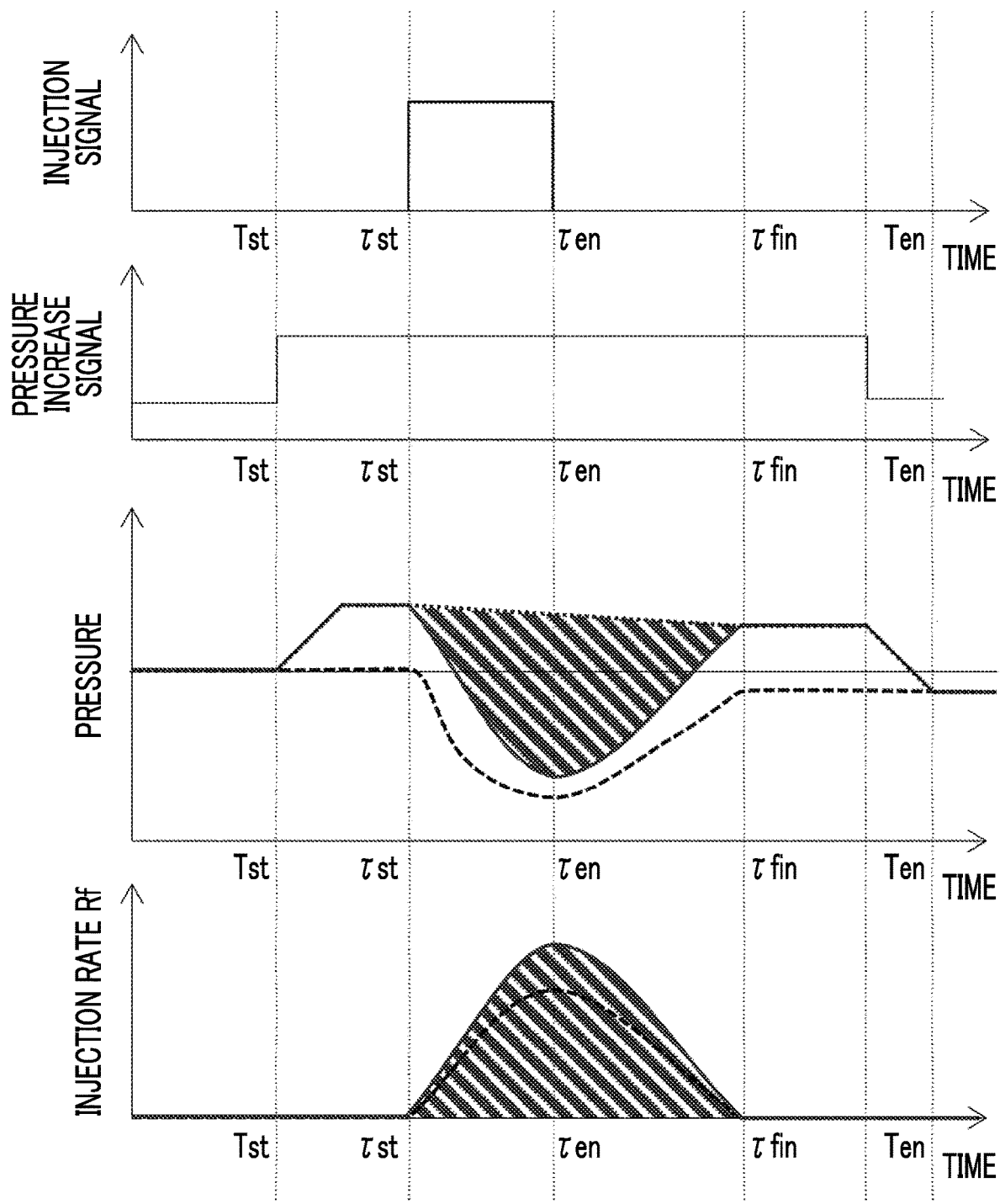
FIG. 5 is a timing chart in a case where fuel is injected while increasing the fuel pressure.

An operation when injecting the fuel having a pressure that has been increased by the pressure increasing device 7 will be described with reference to FIG. 5. FIG. 5 is a timing chart in a case where a pressure increase starts before the fuel is injected and the pressure increase ends after the fuel is injected.

In the present embodiment, the fuel injection starts after the pressure of fuel discharged from the pressure increasing device 7 becomes α times the common rail pressure Pcr, and the pressure increase ends after the fuel injection ends. That is, while fuel injection is being performed, the supply pressure Psup is α times the common rail pressure Pcr. The supply pressure Psup is expressed by the dotted line in FIG. 5, and the fuel injection pressure Pinj is expressed by the solid line in FIG. 5.

The fuel injection pressure Pinj is equal to the pressure of fuel discharged from the pressure increasing device 7 until just before the fuel is injected at time τst. The fuel injection pressure Pinj decreases with fuel injection after time τst, and the fuel injection pressure Pinj approaches the fuel pressure discharged from the pressure increasing device 7 after time τen. In the case of FIG. 5, since the supply pressure Psup is α times the common rail pressure Pcr, the fuel injection amount Q can be calculated in the same manner as in FIG. 4.

Incidentally, the broken line in FIG. 5 indicates a case where fuel is injected without driving the pressure increasing device 7, that is, the fuel injection pressure Pinj and the fuel injection rate Rf in FIG. 4. Since the area of the hatched portion in FIG. 5 is larger than the area of the hatched portion in FIG. 4, it can be seen that a larger amount of fuel can be injected by injecting fuel while driving the pressure increasing device 7 as shown in FIG. 5.

Figure 6:
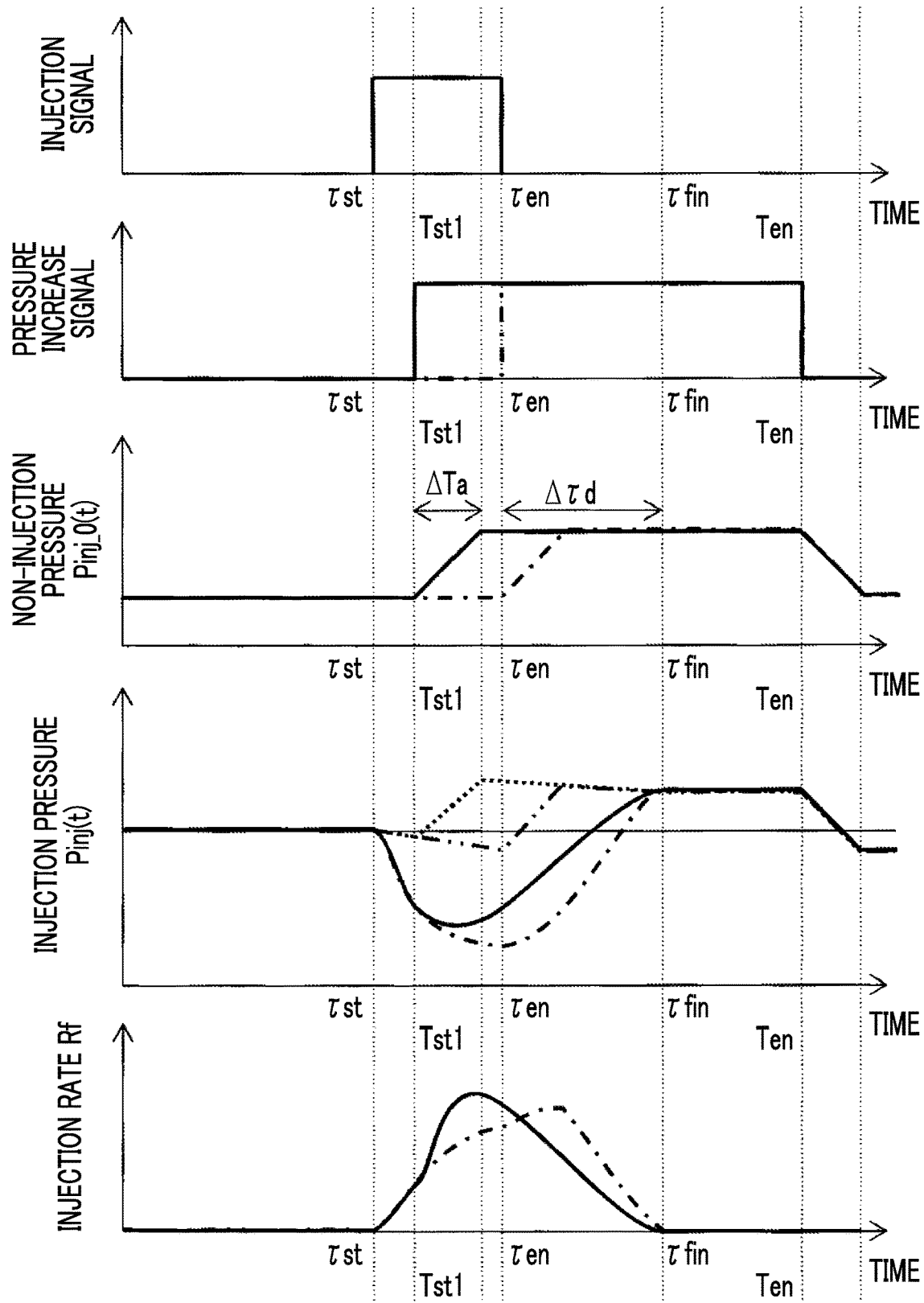
FIG. 6 is a timing chart in a case where the fuel pressure is increased while the fuel is being injected.

Two examples of driving the pressure increasing device 7 after fuel injection is started will be described with reference to FIG. 6. FIG. 6 is a timing chart in a case where pressure increase is performed while fuel is being injected. The solid line in FIG. 6 shows an example in which the pressure increase signal is turned on after the injection signal is turned on and then the injection signal is turned off, and the one-dot chain line in FIG. 6 shows an example in which the pressure increase signal is turned on at the same time as when the injection signal is turned off.

First, the case where the pressure increase signal is turned on after the injection signal is turned on and then the injection signal is turned off will be described. In the fourth graph from the top in FIG. 6, the dotted line indicates the supply pressure Psup, and the solid line indicates the fuel injection pressure Pinj. The supply pressure Psup is the same pressure value as the common rail pressure Pcr until the pressure increasing device 7 is driven after the fuel injection starts at time τst. In the present embodiment, since the common rail pressure Pcr gently decreases with fuel injection, the supply pressure Psup also gently decreases. The fuel injection pressure Pinj decreases in the same manner as the graph of FIG. 4 as fuel is injected.

At time Tst1, the pressure increase signal is turned on. At this time, since the pressure of fuel supplied from the common rail 5 is increased by the pressure increasing device 7, the supply pressure Psup that is the pressure of fuel discharged from the pressure increasing device 7 is multiplied by the time of the acceleration response delay ΔTa. As a result, the fuel injection pressure Pinj is subjected to the action of increase due to the increase in the supply pressure Psup and the action of decrease due to fuel injection. In the present embodiment the fuel injection pressure Pinj decreases.

Then, at time Tst1+ΔTa, the increase in the supply pressure Psup is stopped, and the supply pressure Psup starts to gently decrease due to the injection of fuel.

When time further passes to reach time τen, the injection signal is turned off. The supply pressure Psup continues to gently decrease, and the fuel injection pressure Pinj approaches the supply pressure Psup since the high pressure fuel is supplied from the pressure increasing device 7.

At time τen+Δτd at which the fuel injection ends, the fuel injection pressure Pinj becomes equal to the supply pressure Psup, so that no fuel is injected from the injector 9. Finally, at time Ten after time τen+Δτd, the pressure increase signal is turned off, and the supply pressure Psup and the fuel injection pressure Pinj return to the common rail pressure Pcr before the pressure increase.

The case where the pressure increase signal is turned on at the same time as when the injection signal is turned off will be described. The two-dot chain line in FIG. 6 indicates the supply pressure Psup in the case where the pressure increase signal is turned on at the same time as when the injection signal is turned off at time τen, and the one-dot chain line indicates the fuel injection pressure Pinj in the same case.

In the case where the pressure increase signal is turned on at the same time as when the injection signal is turned off at time τen, the fuel injection pressure Pinj approaches the supply pressure Psup by turning off the injection signal, and the supply pressure Psup is increased by turning on the pressure increase signal. Therefore, the fuel injection pressure Pinj increases more abruptly. When the fuel injection ends at time τen+Δτd, the fuel injection pressure Pinj is equal to the supply pressure Psup.

As can be seen from the comparison between the solid line and the chain line in FIG. 6, when the time at which the pressure increase signal is turned on changes, the shape of the supply pressure Psup and the shape of the fuel injection pressure Pinj change. Therefore, the shape of the fuel injection rate Rf also changes. For example, referring to the bottom graph in FIG. 6 showing a temporal change in the fuel injection rate Rf, it can be seen that the time at which the solid line graph is the peak in the present embodiment is earlier than the time at which the chain line graph is the peak and the shape of the fuel injection rate Rf is changed. In order to correctly calculate the fuel injection rate Rf in the case of driving the pressure increasing device 7, waveforms relevant to temporal changes in the supply pressure Psup and the fuel injection pressure Pinj needs to be known. Since the fuel injection pressure Pinj can be directly measured, the supply pressure Psup that cannot be directly measured needs to be calculated in order to calculate the fuel injection rate Rf.

In the present embodiment, the waveform of the fuel injection pressure Pinj in a case where no fuel is injected is stored in the electronic control unit 20 in advance. The electronic control unit 20 calculates the waveform of the supply pressure Psup based on the stored waveform of the fuel injection pressure Pinj. The electronic control unit 20 calculates the fuel injection rate Rf and the fuel injection amount Q from the difference between the supply pressure Psup and the fuel injection pressure Pinj obtained by direct measurement. Hereinafter, the fuel injection pressure Pinj in a case where no fuel is injected will be referred to as "non-injection pressure Pinj_0". The third graph from the top in FIG. 6 shows a temporal change in the fuel injection pressure Pinj under the assumption that the injection signal is OFF, that is, a temporal change in the non-injection pressure Pinj_0 at all times from time τst to time τen. The graphs other than the third graph from the top in FIG. 6 are graphs under the assumption that the injection signal is turned on, whereas the injection signal is always OFF solely in the graph of the non-injection pressure Pinj_0. That is, solely the graph of the non-injection pressure Pinj_0 is different in assumption, but is expressed in the same column as other graphs for the sake of convenience.

Figure 7:
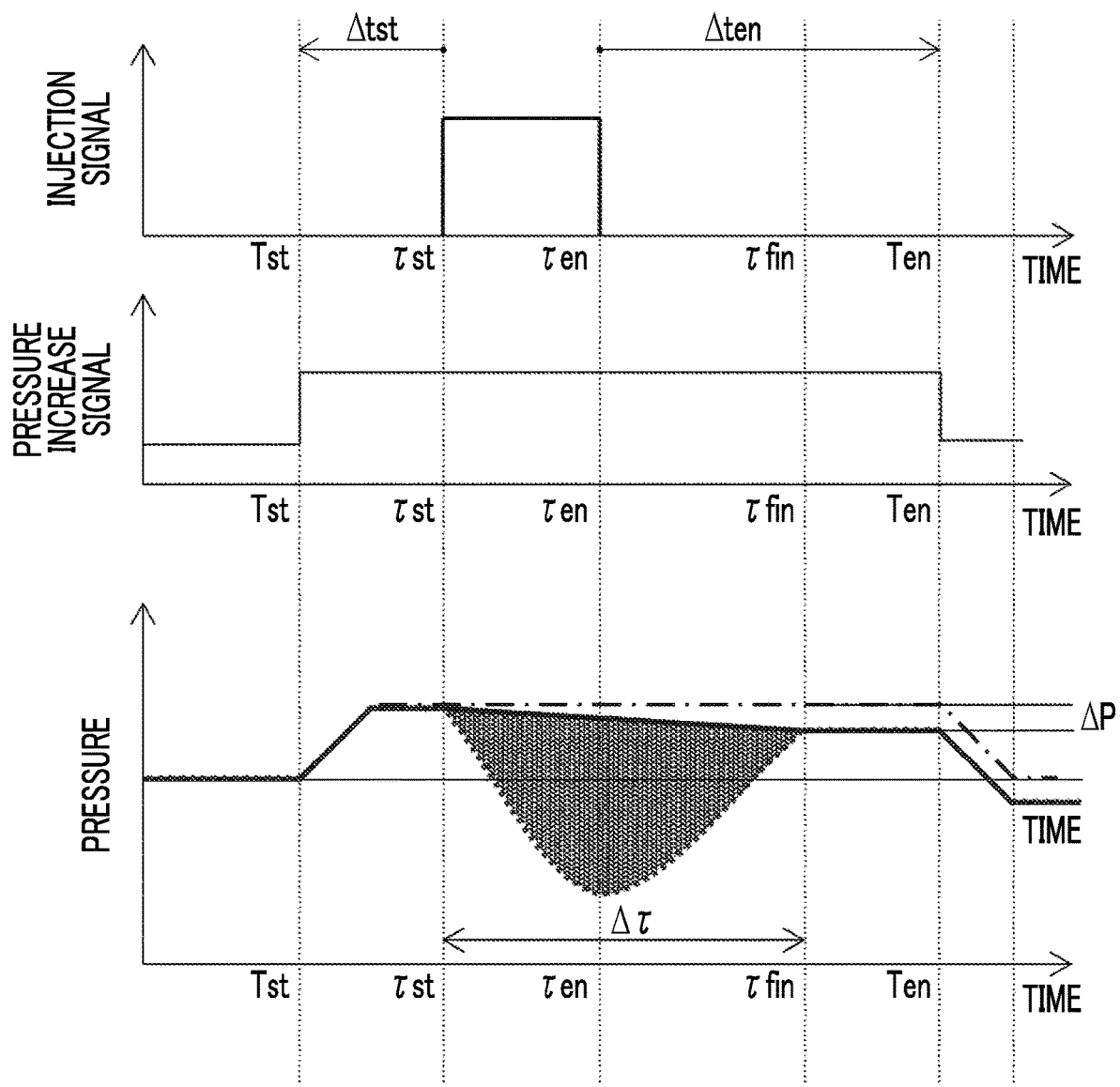
FIG. 7 is a timing chart showing a temporal change in supply pressure in a case where fuel is injected while increasing the fuel pressure and a temporal change in non-injection pressure.

Incidentally, the non-injection pressure Pinj_0 and the supply pressure Psup are correlated, but are not the same. FIG. 7 is a graph for comparing the temporal change in the non-injection pressure Pinj_0 with the temporal change in the supply pressure Psup in a situation where the pressure increase signal is turned on before the injection signal is turned on and the pressure increase signal is turned off after the injection signal is turned off as shown in FIG. 5. The solid line in FIG. 7 indicates the supply pressure Psup, the chain line indicates the non-injection pressure Pinj_0, and the dotted line indicates the fuel injection pressure Pinj at the time of fuel injection. When the supply pressure Psup is compared with the non-injection pressure Pinj_0, the effect of a decrease in the common rail pressure Pcr according to fuel injection is taken into consideration for the supply pressure Psup, whereas the effect of a decrease in the common rail pressure Pcr is not taken into consideration for the non-injection pressure Pinj_0. For this reason, the supply pressure Psup is lower than the non-injection pressure Pinj_0.

Therefore, in the present embodiment, in the case of calculating the fuel injection rate Rf and the fuel injection amount Q based on the non-injection pressure Pinj_0, correction to eliminate a difference between the non-injection pressure Pinj_0 and the common rail pressure Pcr is performed. For example, the time at which fuel injection ends is assumed to be τfin, the differential pressure between the non-injection pressure Pinj_0 and the fuel injection pressure Pinj at the time at which fuel injection ends is assumed to be an injection differential pressure ΔP, and a period during which fuel is injected, that is, the length of time from τst to τfin is assumed to be an injection period Δt. Assuming that the common rail pressure Pcr decreases by ΔP at a constant speed over time Δτ, the supply pressure Psup at time t can be expressed as follows. By integrating the difference between the supply pressure Psup and the fuel injection pressure Pinj, the fuel injection amount Q can be calculated.

(1) When time t is equal to or less than τst, Psup(t)=Pinj_0(t)

(2) When time t is equal to or more than τst and equal to or less than τfin, Psup(t)=Pinj_0(t)−ΔP×(t−τst)/Δt (3) When time t is equal to or more than τfin, Psup(t)=Pinj_0(t)−ΔP The waveform of the non-injection pressure Pinj_0 changes according to the time difference between the time at which the injection signal is switched and the time at which the pressure increase signal is switched. Therefore, in the present embodiment, the waveform of the fuel injection pressure Pinj is stored for each time difference between the injection signal and the pressure increase signal. Hereinafter, the time difference between time τst at which the injection signal is switched from OFF to ON and time Tst at which the pressure increase signal is switched from OFF to ON, that is, Tst−τst, will be referred to as a "start time difference Δtst". Similarly, the time difference between time τen at which the injection signal is switched from ON to OFF and time Ten at which the pressure increase signal is switched from ON to OFF, that is, Ten−τen, will be referred to as an "end time difference Δten".

Incidentally, the non-injection pressure Pinj_0 changes according to the common rail pressure Pcr as well as the start time difference Δtst and the end time difference Δten. Since the common rail pressure Pcr and the non-injection pressure Pinj_0 are in a proportional relationship, the waveform of the non-injection pressure Pinj_0 is basically transformed into a similar shape when the common rail pressure Pcr changes. Therefore, since the change in the waveform of the non-injection pressure Pinj_0 according to the start time difference Δtst and the end time difference Δten is more complicated than the change in the waveform of the non-injection pressure Pinj_0 according to the common rail pressure Pcr, the non-injection pressure Pinj_0 corresponding to at least the start time difference Δtst and the end time difference Δten is stored.

Figure 8:
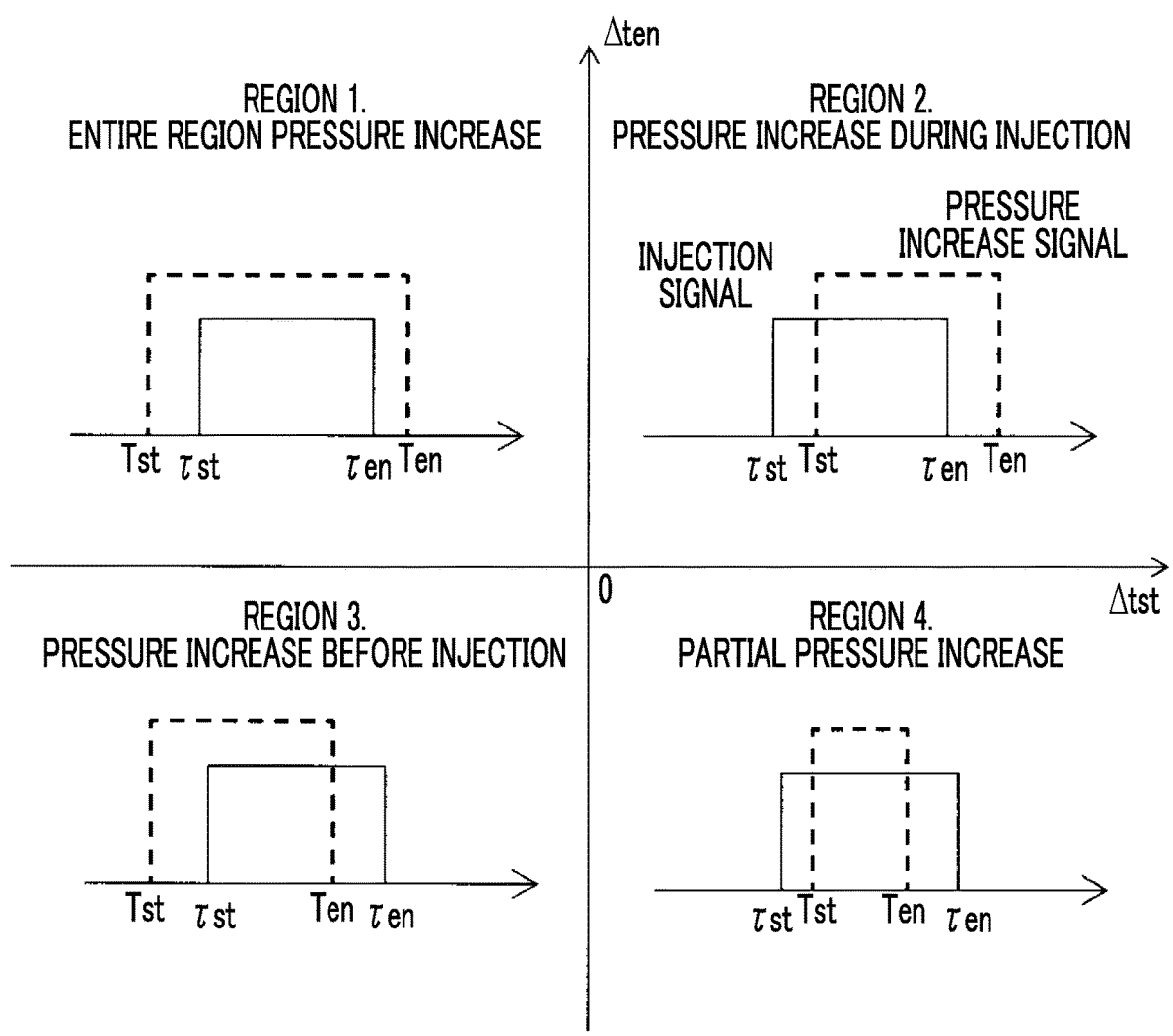
FIG. 8 is a graph showing the outline of the relationship between the pressure increase signal and the injection signal.

FIG. 8 is a diagram schematically showing the relationship between the pressure increase signal and the injection signal. The horizontal axis in FIG. 8 indicates the start time difference Δtst, and the vertical axis in FIG. 8 indicates the end time difference Δten. For example, the origin in FIG. 8 indicates a case where the start time difference Δtst is 0 and the end time difference Δten is 0, that is, the pressure increase signal and the injection signal are simultaneously switched from OFF to ON and the pressure increase signal and the injection signal are simultaneously switched from ON to OFF.

The graph in FIG. 8 is divided into four regions with the time at which the injection signal is switched as a reference. The first region is a region (upper left region in FIG. 8) of Δtst<0 and Δten>0, that is, Tst<τst and Ten>τen. In the first region, a state in which the pressure increasing device 7 continues to be driven while fuel injection is being performed, that is, a state such as that shown in FIG. 5, is shown. Hereinafter, the first region will be referred to as an entire region pressure increase region.

The second region is a region (upper right region in FIG. 8) of Δtst>0 and Δten>0, that is, Tst>τst and Ten>τen. In the second region, a state in which the pressure increasing device 7 is not driven at the time at which fuel injection starts and fuel pressure increase by the pressure increasing device 7 starts while fuel injection is being performed, that is, a state such as that shown in FIG. 6, is shown. Hereinafter, the second region will be referred to as a pressure increase region during injection.

The third region is a region (lower left region in FIG. 8) of Δtst<0 and Δten<0, that is, Tst<τst and Ten<τen. In the third region, the pressure increase signal is switched to ON before the fuel injection starts, and the pressure increase signal is switched to OFF before the injection signal is turned off. Hereinafter, the third region will be referred to as a pressure increase region before injection.

The fourth region is a region (lower right region in FIG. 8) of Δtst>0 and Δten<0, that is, Tst>τst and Ten<τen. In the fourth region, the pressure increase signal is switched to ON after the fuel injection starts, and the pressure increase signal is switched to OFF before the injection signal is switched to OFF. Hereinafter, the fourth region will be referred to as a partial pressure increase region.

Figure 9:
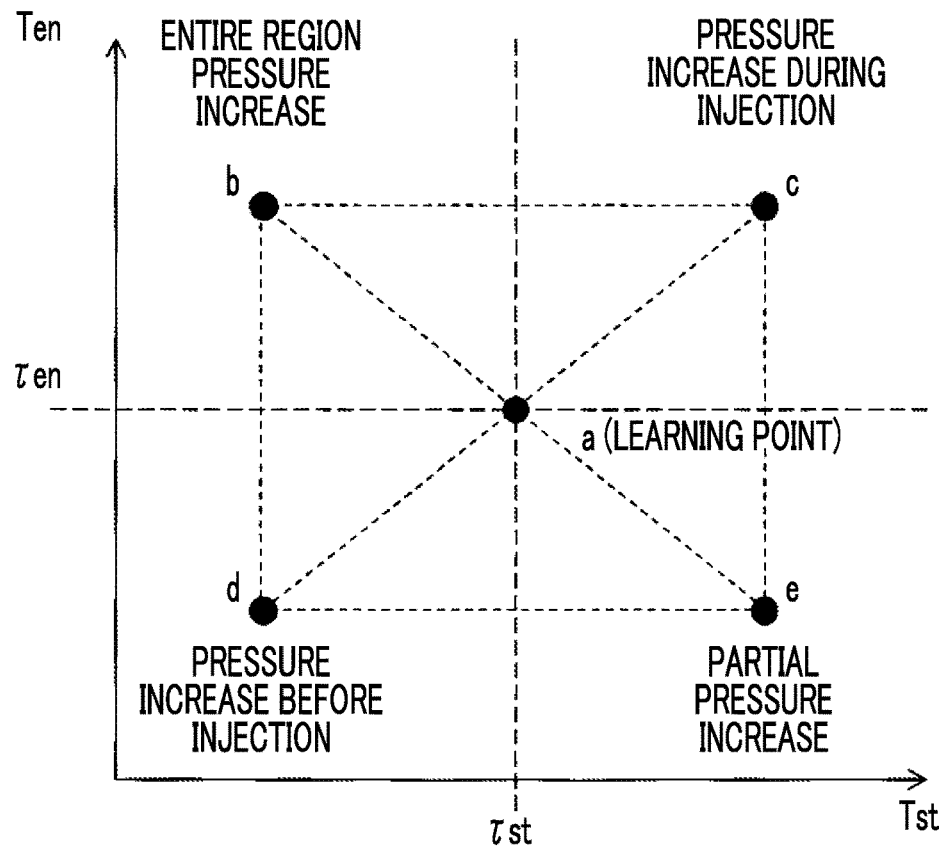
FIG. 9 is a schematic diagram showing learning points.

In the present embodiment, the non-injection pressure Pinj_0 is stored for a total of five points of a point selected from each of the first region to the fourth region and a point at which Δtst=0 and Δten=0, that is, Tst=τst and Ten=τen (hereinafter, the above-described points will be referred to as "learning points"). FIG. 9 is a schematic diagram showing learning points (from point a to point e) in the present embodiment. The non-injection pressure Pinj_0 at a point not corresponding to any of the points a to e can be calculated by interpolating the non-injection pressure Pinj_0 at a learning point closest to the point not corresponding to any of the points a to e.

Figure 10:
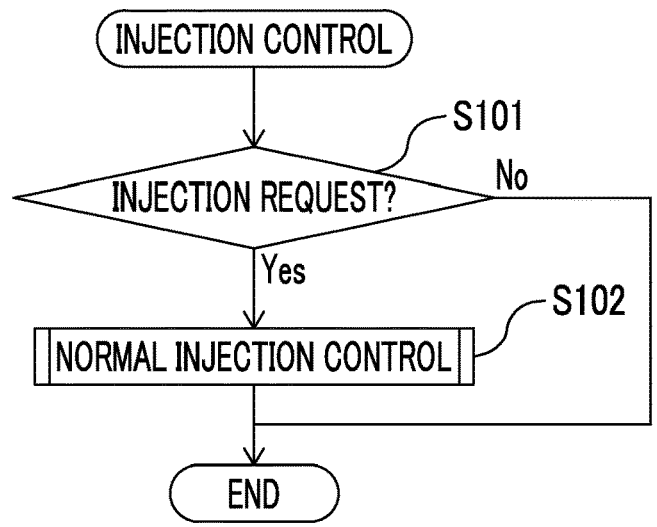
FIG. 10 is a flowchart showing a routine for performing fuel injection in the first embodiment.

Control in the first embodiment of the present disclosure will be described. FIG. 10 is a flowchart showing a routine for performing fuel injection in the first embodiment. The flowchart shown in FIG. 10 is repeatedly executed at fixed periods.

In step S101, the electronic control unit 20 determines whether or not there is an injection request. When there is an injection request, the process proceeds to step S102 to perform fuel injection. When there is no injection request, the electronic control unit 20 ends this routine without performing fuel injection.

In step S102, the electronic control unit 20 performs normal injection control to inject fuel by controlling the supply pump 3, the pressure increasing device 7, and the injector 9 based on the operation state, such as the load of the internal combustion engine 100 (hereinafter, referred to as "engine load") Kl and the rotation speed of the internal combustion engine 100 (hereinafter, referred to as "engine speed") Ne. Details of the normal injection control will be described later with reference to FIGS. 11 to 14. When the control of step S102 ends, the electronic control unit 20 ends the processing of this routine.

Figure 11:
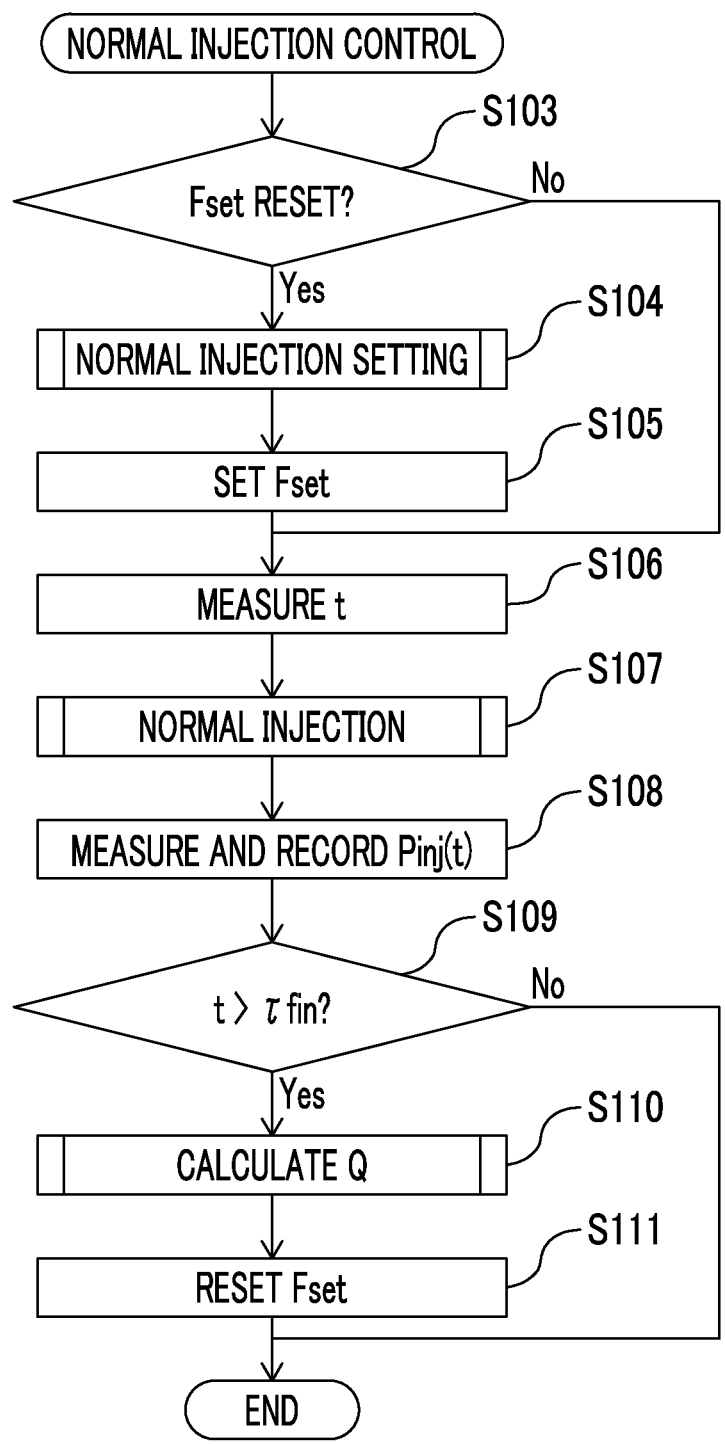
FIG. 11 is a flowchart showing the routine of fuel injection in the normal state in the first embodiment.

The normal injection control in the first embodiment of the present disclosure will be described. FIG. 11 is a flowchart showing a routine of the normal injection control in the first embodiment of the present disclosure. This routine is called each time step S102 in FIG. 10 is executed. The normal injection control is control for applying power to the internal combustion engine 100 to execute fuel injection for making the vehicle travel.

In step S103, the electronic control unit 20 determines whether or not an injection setting flag Fset, which is set in a case where the setting of fuel injection is performed, is in the reset state. In a case where the injection setting flag Fset is in the set state, the process proceeds to step S106 since the setting of fuel injection is not needed. In a case where the injection setting flag Fset is in the reset state, the process proceeds to step S104 since the setting of fuel injection is needed. The initial state of the injection setting flag Fset is a reset state.

In step S104, the electronic control unit 20 performs normal injection setting processing for setting the common rail pressure Pcr and the operations of the pressure increasing device 7 and the injector 9 in order to perform normal injection in which fuel injection of the amount corresponding to the engine load Kl is injected. Details of the normal injection setting processing will be described later with reference to FIG. 12. In the present embodiment, the setting of fuel injection in step S104 is performed just once each time fuel injection is performed.

In step S105, the electronic control unit 20 sets the injection setting flag Fset that is set when the setting of fuel injection ends. By setting the injection setting flag Fset, fuel injection is not set every time this routine is executed.

In step S106, the electronic control unit 20 measures a crank angle t obtained from the crank angle sensor 16. In step S107, the electronic control unit 20 determines whether or not to output the pressure increase signal and the injection signal with reference to the crank angle t, and controls the supply pump 3 based on the target common rail pressure Pcr_t. In the present embodiment, the injection signal is switched to ON when the crank angle t reaches τst, and the pressure increase signal is switched to OFF when the crank angle t reaches τen. Similarly, the injection signal is switched to ON when the crank angle t reaches Tst, and the injection signal is switched to OFF when the crank angle t reaches Ten.

In step S108, the electronic control unit 20 calculates a fuel injection pressure Pinj(t) based on the measured value Pinj_s of the fuel injection pressure, which can be obtained from the injection pressure sensor 91, and records the calculated fuel injection pressure Pinj(t). In the present embodiment the electronic control unit 20 stores the fuel injection pressure Pinj(t) for each crank angle t.

In step S109, the electronic control unit 20 determines whether or not the fuel injection has ended based on the crank angle t obtained in step S106 and the injection end time τfin indicating the fuel injection end time set in advance. In a case where the electronic control unit 20 can determine that the fuel injection has ended since the crank angle t is larger than the injection end time τfin, the process proceeds to step S110. In a case where the electronic control unit 20 can determine that the fuel injection is continued since the crank angle t is equal to or less than the injection end time τfin, the processing of this routine ends.

In step S110, the electronic control unit 20 calculates the fuel injection amount Q that is the amount of fuel actually injected from the injector 9. A specific method of calculating the fuel injection amount Q in the present embodiment will be described later.

In step S111, the electronic control unit 20 resets the injection setting flag Fset. That is, since the fuel injection has ended, the electronic control unit 20 resets a new injection for the next fuel injection. When the processing of step S111 ends, the electronic control unit 20 ends the processing of this routine.

Figure 12:
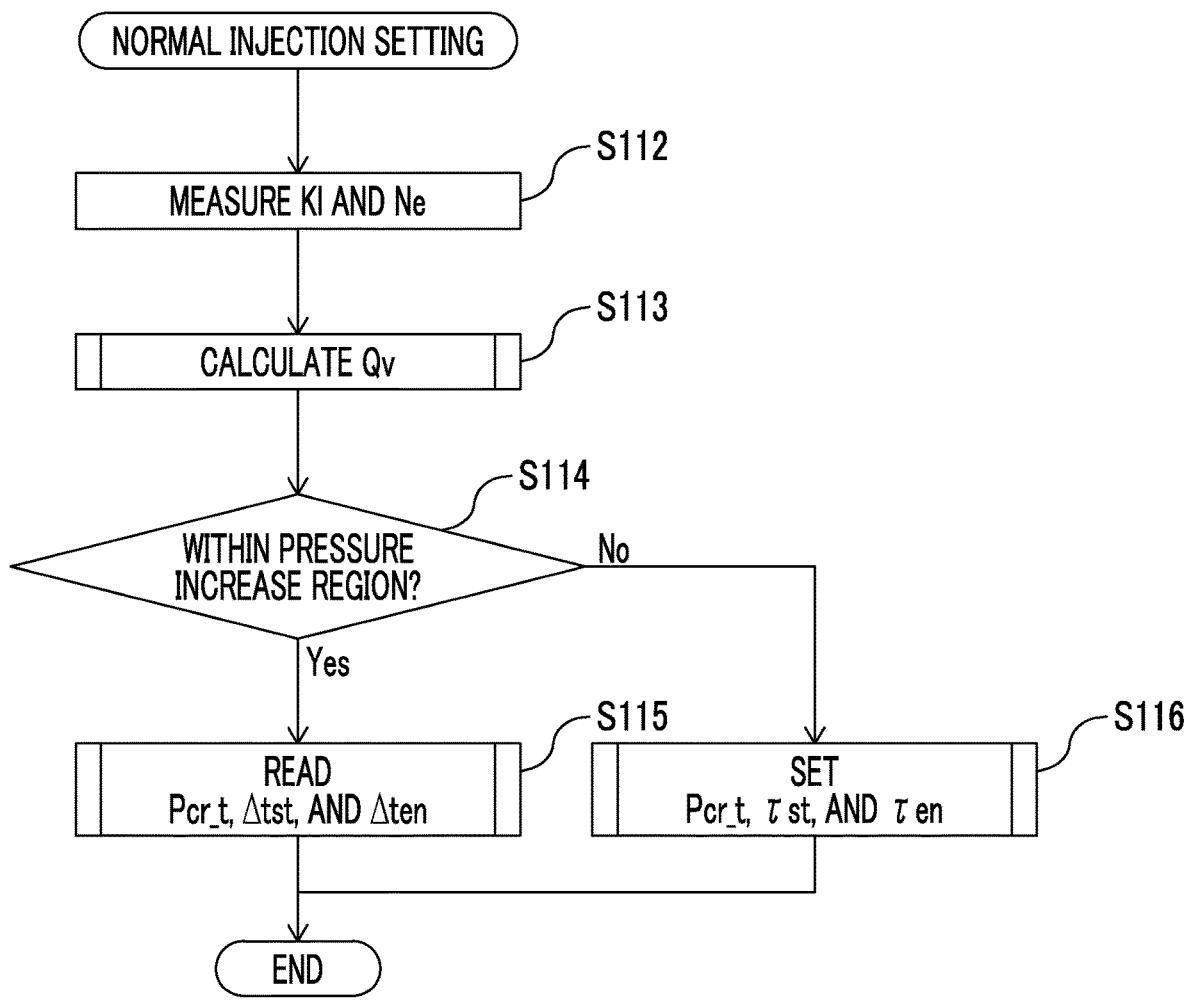
FIG. 12 is a flowchart showing a routine relevant to the setting of normal injection.

The normal injection setting processing in the first embodiment of the present disclosure will be described. FIG. 12 is a flowchart showing a routine relevant to the normal injection setting processing. This routine is called each time step S104 in the flowchart of FIG. 11 is executed.

In step S112, the engine load Kl is measured based on the depression amount of the accelerator pedal measured by the accelerator pedal depression amount sensor 15. In addition, the electronic control unit 20 measures the engine speed Ne based on the rotation speed of the crank angle sensor measured by the crank angle sensor 16.

In step S113, the electronic control unit 20 calculates a target fuel injection amount (hereinafter, referred to as a "request injection amount") Qv based on the engine load Kl measured in step S112.

Figure 13:
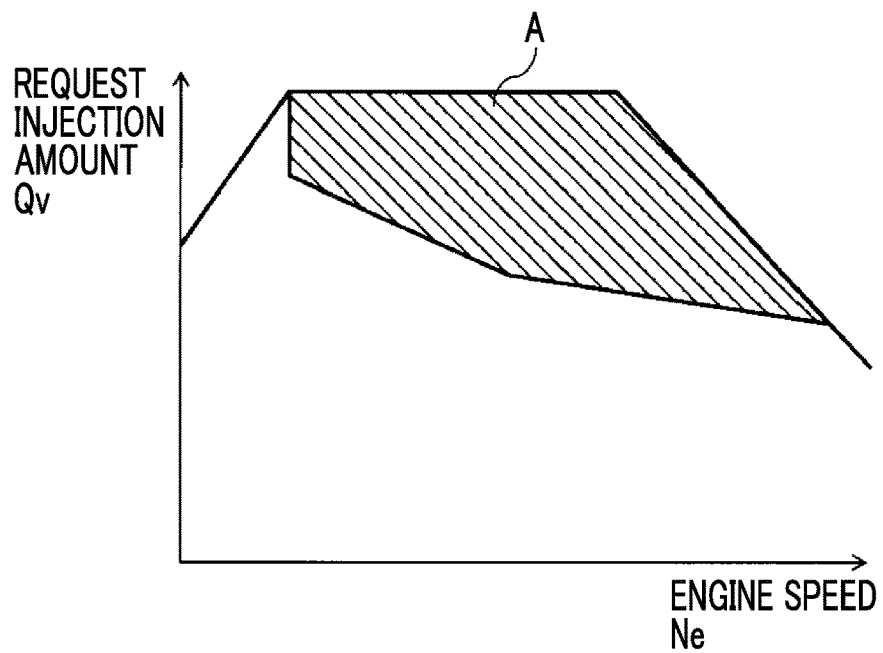
FIG. 13 is a schematic diagram of a map for determining whether or not to drive the pressure increasing device in the first embodiment.

In step S114, the electronic control unit 20 determines whether or not to drive the pressure increasing device 7. The electronic control unit 20 stores a map n which a region for driving the pressure increasing device 7 is set corresponding to the engine speed Ne and the request injection amount Qv. FIG. 13 shows an example of a map in which a region for driving the pressure increasing device 7 is set. In the present embodiment, a map is set so as to drive the pressure increasing device 7 in a region where the amount of fuel that can be injected without driving the pressure increasing device 7 is smaller than the request injection amount Qv. In the present embodiment, the pressure increasing device 7 is driven in a case where the engine speed Ne and the request injection amount Qv are included in a region A expressed by the hatched portion in FIG. 13, and the pressure increasing device 7 is not driven in a case where the engine speed Ne and the request injection amount Qv are not included in the region A in FIG. 13. In a case where the pressure increasing device 7 is driven in step S114, the process proceeds to step S115 to drive the pressure increasing device 7. In a case where the pressure increasing device 7 is not driven in step S114, the process proceeds to step S116.

In step S115, the electronic control unit 20 reads the target common rail pressure Pcr_t that is the target value of the common rail pressure Pcr, the start time difference Δtst, and the end time difference Δten based on the engine speed Ne and the request injection amount Qv. In the present embodiment, the electronic control unit 20 stores the common rail pressure Pcr, the start time difference Δtst, and the end time difference Δten corresponding to the engine speed Ne and the request injection amount Qv. The fuel injection amount Q in a case where fuel is injected based on the conditions of the stored common rail pressure Pcr, start time difference Δtst, and end time difference Δten is referred to as a "stored fuel injection amount Qm".

The stored fuel injection amount Qm in the present embodiment will be described in detail. First, the electronic control unit 20 stores the stored fuel injection amount Qm in advance when the fuel pressure is increased by using the ideal pressure increasing device 7 (for example, the pressure increasing device 7 that does not deteriorate and is driven according to the model) corresponding to a certain engine speed Ne and a certain request injection amount Qv. In the present embodiment, the condition of the common rail pressure Pcr, the condition of the injection signal, and the condition of the pressure increase signal (hereinafter, referred to as "reference injection conditions"), which are references for calculating the stored fuel injection amount Qm, are defined as follows.

Common rail pressure Pcrb as a reference.

Time τstb as a reference for switching the injection signal from OFF to ON.

Time τenb as a reference for switching the injection signal from ON to OFF.

Time Tstb as a reference for switching the pressure increase signal from OFF to ON.

Time Tenb as a reference for switching the pressure increase signal from ON to OFF.

Incidentally, the actual pressure increasing device 7 is different from the ideal pressure increasing device 7 due to a characteristic change due to deterioration according to use and a characteristic difference due to individual differences. For this reason, even when fuel is injected based on the above-described reference injection conditions, an error occurs between the actual fuel injection amount Q and the stored fuel injection amount Qm. In order to further reduce the error, the reference injection conditions are corrected for each pressure increasing device 7. The correction value for correcting the reference injection conditions as described above is referred to as a "correction value K", and the actual fuel injection amount is referred to as a "measured fuel injection amount Qr".

In the present embodiment, when the characteristics of the pressure increasing device 7 change, the pressure waveform at the time of fuel injection changes. As described above, the pressure waveform differs for each of the common rail pressure Pcr, the start time difference Δtst, and the end time difference Δten. Therefore, as in the case of the pressure waveform, the correction value K for correcting the change in the characteristics of the pressure increasing device 7 also differs for each of the common rail pressure Pcr, the start time difference Δtst, and the end time difference Δten. For this reason, the correction value K is stored for each of the common rail pressure Pcr, the start time difference Δtst, and the end time difference Δten.

Incidentally, in the present embodiment, solely time τenb as a reference for switching the injection signal from ON to OFF is corrected. That is, assuming that the correction value is K, time τen at which the injection signal is switched from ON to OFF is expressed as τen=τenb×K. To summarize the above, in the present embodiment, the stored fuel injection amount Qm and the reference injection conditions (Pcrb, τstb, τenb, Tstb, Tenb) are stored for each of the pressure increasing device 7, the engine speed Ne, and the request injection amount Qv. The correction value K is stored for each (Pcrb, τtst=Tstb−τstb, Δten=Tenb−τenb), By correcting at least one of τstb, τenb, Tstb, and Tenb, the measured fuel injection amount Qr and the stored fuel injection amount Qm can be made close to each other.

Returning to the description of the flowchart of FIG. 12, in step S115, the electronic control unit 20 sets the common rail pressure Pcr, the start time difference Δtst, and the end time difference Δten such that the request injection amount Qv and the stored fuel injection amount Qm are the same. In the present embodiment, the electronic control unit 20 sets Pcr=Pcrb, Δtst=Tstb−τstb, and Δten=Tenb−τenb×K. When the electronic control unit 20 ends step S115, this routine ends and the process returns to step S105 in FIG. 11.

In step S116, the electronic control unit 20 reads the target common rail pressure Pcr_t. In step S116, since the fuel is injected without driving the pressure increasing device 7, Tst and Ten are not set. In the present embodiment, the target common rail pressure Pcr_t is set to the common rail pressure Pcrb corresponding to the engine speed Ne and the request injection amount Qv. τst and τen are set such that the fuel of the request injection amount Qv can be injected without driving the pressure increasing device 7. Time τst at which the injection signal is switched from OFF to ON and time τen at which the injection signal is switched from ON to OFF are set. When the electronic control unit 20 ends the processing of step S116, this routine ends and the process returns to step S105 in FIG. 11. The electronic control unit 20 may control the fuel injection amount Q by controlling the common rail pressure Pcr.

Figure 14:
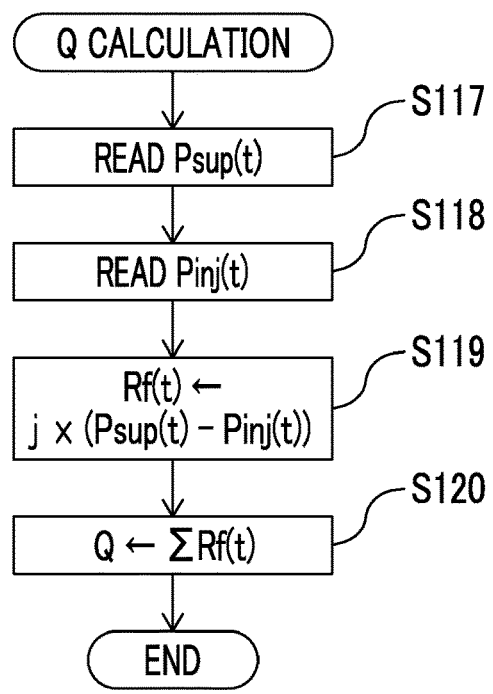
FIG. 14 is a flowchart showing a routine for calculating a fuel injection amount in the first embodiment.

Finally, a method of calculating the measured fuel injection amount Qr according to the first embodiment of the present disclosure will be described. FIG. 14 is a flowchart showing a routine n a case where the electronic control unit 20 according to the first embodiment of the present disclosure calculates the measured fuel injection amount Qr. This routine is called each time step S110 in the flowchart of FIG. 11 is executed.

In step S117, the electronic control unit 20 reads the value of the supply pressure Psup(t) stored in advance for each crank angle t. Then, in step S118, the electronic control unit 20 reads the value of the fuel injection pressure Pinj(t) stored for each crank angle t. That is, in steps S117 and S118, the values of the supply pressure Psup and the fuel injection pressure Pinj with respect to the crank angle t are read.

In step S119, the electronic control unit 20 calculates a fuel injection rate Rf(t) by subtracting the fuel injection pressure Pinj(t) from the supply pressure Psup(t) for each crank angle t and multiplying the subtraction result by a proportional coefficient j. That is, the waveform of the fuel injection rate Rf is calculated. Incidentally, in the present embodiment, the supply pressure Psup is a value obtained by correcting a waveform determined based on the fuel injection pressure Pinj when fuel injection is not performed. Therefore, subtracting the fuel injection pressure Pinj from the supply pressure Psup means substantially subtracting the fuel injection pressure Pinj measured in a case where fuel injection is performed from the non-injection pressure Pinj_0 measured in a case where fuel injection is not performed. In the present embodiment, the proportional coefficient j for calculating the fuel injection rate Rf is a constant experimentally obtained in advance.

In step S120, the electronic control unit 20 calculates the measured fuel injection amount Qr by integrating the fuel injection rate Rf(t) with respect to the crank angle t. When the calculation of the measured fuel injection amount Qr ends, the electronic control unit 20 ends this routine, proceeds to step S111 in FIG. 11, and ends the routine of FIG. 11.

As described above, according to the first embodiment of the present disclosure, the control device for an internal combustion engine includes the injector 9 (fuel injector) that injects fuel, the pressure increasing device 7 that is provided upstream of the injector 9 (fuel injector) and increases the pressure of fuel supplied to the injector 9 (fuel injector), and the electronic control unit 20. The electronic control unit 20 (control device) calculates the measured fuel injection amount Qr, which is the actual fuel injection amount, based on the difference between the non-injection pressure Pinj_0 (t), which is the fuel pressure in the injector 9 (fuel injector) in a case where the pressure increasing device 7 increases the fuel pressure without injecting the fuel by the injector 9 (fuel injector), and the fuel injection pressure Pinj(t), which is the fuel pressure in the injector 9 (fuel injector) in a case where the injector 9 (fuel injector) performs fuel injection according to the driving of the pressure increasing device 7.

As described above, according to the first embodiment of the present disclosure, the measured fuel injection amount Qr is calculated by measuring the fuel injection pressure Pinj(t) at the same time as fuel injection and calculating the difference between the fuel injection pressure Pinj(t) and the supply pressure Psup(t) stored in advance. As a result, even in the internal combustion engine 100 to which the pressure increasing device 7 is applied, the fuel injection amount Q can be accurately calculated.

According to the first embodiment of the present disclosure, the electronic control unit 20 stores the stored fuel injection amount Qm that is the fuel injection amount determined based on the common rail pressure Pcr (the pressure of fuel supplied to the pressure increasing device 7), the fuel injection time τstb or the fuel injection time τenb of the injector 9 (fuel injector), and the pressure increase time Tstb or the pressure increase time Tenb of the pressure increasing device 7. At least one of time τstb, time τenb, time Tstb, and time Tenb (fuel injection time or pressure increase time) is corrected using the correction value K so that the measured fuel injection amount Qr (actual fuel injection amount) and the stored fuel injection amount Qm are made close to each other. The electronic control unit 20 controls the injector 9 (fuel injector) based on the corrected τstb or τenb (fuel injection time), or controls the pressure increasing device 7 based on the corrected Tstb or Tenb (pressure increase time).

As described above, according to the first embodiment of the present disclosure, since the pressure increasing device 7 or the injector 9 is corrected so that the measured fuel injection amount Qr approaches the request injection amount Qv, the control accuracy of the fuel injection amount Q is increased.

Second Embodiment

A second embodiment of the present disclosure will be described. The second embodiment of the present disclosure is different from the first embodiment of the present disclosure in that the electronic control unit 20 updates the correction value K of the pressure increase time or the injection time for injecting fuel of merely the stored fuel injection amount Qm, which is stored in the electronic control unit 20, in a case where the internal combustion engine 100 is in an idle operation state.

Figure 15:
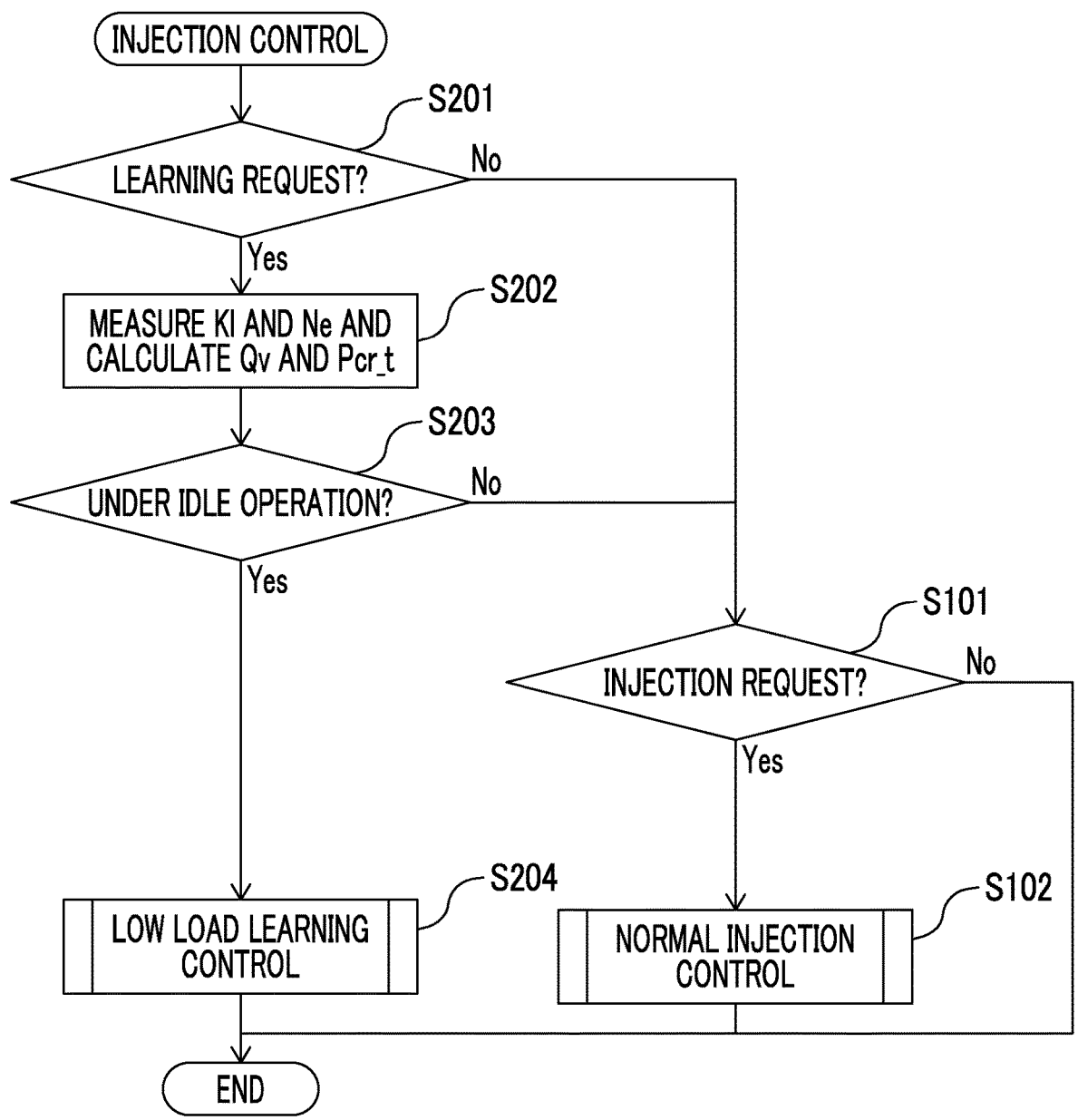
FIG. 15 is a flowchart showing a routine for performing fuel injection in a second embodiment.

First, injection control according to the second embodiment of the present disclosure will be described. FIG. 15 is a flowchart showing a routine of the injection control according to the second embodiment. This routine is periodically executed at fixed periods.

In step S201, the electronic control unit 20 determines whether or not there is a learning request output from another routine in a case where the updating of the correction value K is needed. In a case where there is a learning request, the process proceeds to step S202 to update the correction value K. In a case where there is no learning request, the process proceeds to step S101 to perform normal fuel injection. Since step S101 and step S102 are the same as those in the first embodiment, the description will be omitted below. In the present embodiment, the learning request is transmitted by the electronic control unit 20 when the traveling distance of the vehicle reaches a predetermined distance.

In step S202, the electronic control unit 20 measures the operation state, that is, the engine load Kl and the engine speed Ne, and calculates the request injection amount Qv and the target common rail pressure Pcr_t based on the engine load Kl and the engine speed Ne. In step S203, the electronic control unit 20 determines whether or not the internal combustion engine 100 is in the idle operation state based on the engine load Kl, the engine speed Ne, the request injection amount Qv, and the target common rail pressure Pcr_t that have been acquired in step S202. In the present embodiment, in a case where the engine load Kl is smaller than a predetermined value and the engine speed Ne is smaller than a predetermined value, the electronic control unit 20 determines that the internal combustion engine 100 is in the idle operation state. In a case where the electronic control unit 20 determines that the internal combustion engine 100 is in the idle operation state, the process proceeds to step S204 to update the correction value K. In a case where the electronic control unit 20 determines that the internal combustion engine 100 is not in the idle operation state, the electronic control unit 20 determines that the correction value K cannot be updated, and proceeds to step S101.

In step S204, the electronic control unit 20 performs learning control for updating the correction value K. In particular, since step S204 is executed in the idle operation state, step S204 is referred to as "low load learning control". Details of step S204 will be described below with reference to the flowchart of FIG. 16. When the electronic control unit 20 ends the processing of step S204, the processing of this routine ends.

Figure 16:
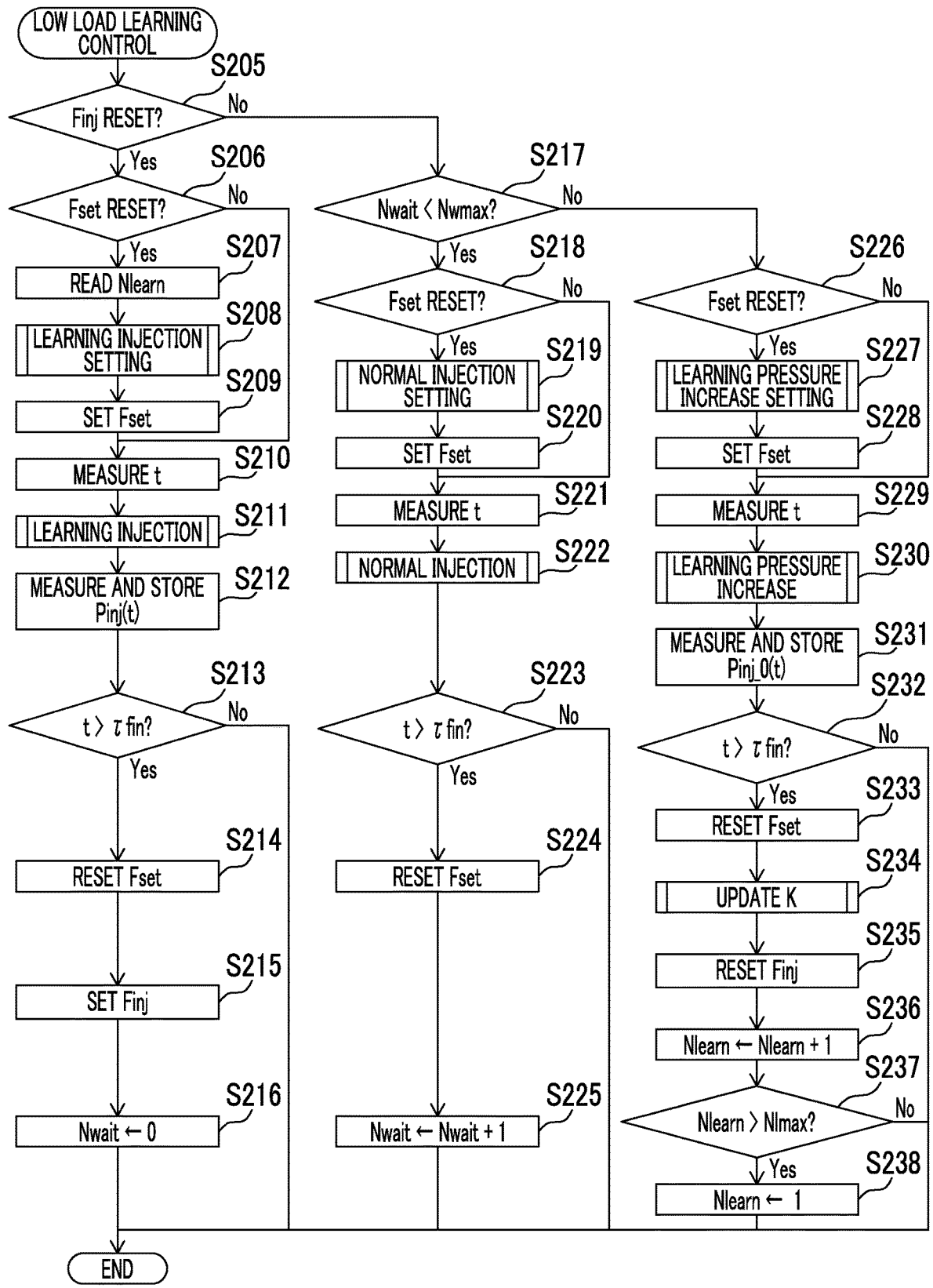
FIG. 16 is a flowchart showing a routine for perforating low load learning control in the second embodiment.

FIG. 16 is a flowchart showing a routine of low load learning control in the second embodiment of the present disclosure. The flowchart of FIG. 16 is called each time step S204 in the flowchart of FIG. 15 is executed.

In step S205, the electronic control unit 20 determines whether or not an injection measurement flag Finj indicating that the fuel injection pressure Pinj has been measured is in the reset state. In a case where the injection measurement flag Finj is in the reset state, the electronic control unit 20 proceeds to step S206 to measure the fuel injection pressure Pinj. In a case where the injection measurement flag Finj is in a set state, the electronic control unit 20 determines that measurement of the fuel injection pressure Pinj is not needed, and proceeds to step S217. The initial state of the injection measurement flag Finj is a reset state.

In step S206, the electronic control unit 20 determines whether or not the injection setting flag Fset that is set in a case where the setting of fuel injection has ended is in the reset state. In a case where the injection setting flag Fset is in the reset state, the electronic control unit 20 determines that the setting of fuel injection has not ended, and proceeds to step S207. In a case where the injection setting flag Fset is in the set state, the electronic control unit 20 determines that the setting of fuel injection has ended, and proceeds to step S210.

In step S207, the electronic control unit 20 reads a point Nlearn that is a learning point to be updated next. For example, in the present embodiment, the electronic control unit 20 selects one learning point from the learning points a to e in FIG. 9.

In step S208, the electronic control unit 20 drives the pressure increasing device 7 at a time corresponding to the point Nlearn, and sets the driving time and the fuel injection, time of the pressure increasing device 7 so that the fuel is injected at the time corresponding to the point Nlearn. Hereinafter, the fuel injection for updating the correction value K will be referred to as "learning injection". In step S209, the electronic control unit 20 sets the injection setting flag Fset since the fuel injection setting has ended.

In step S210, the electronic control unit 20 measures the crank angle t using the crank angle sensor 16. In step S211, the electronic control unit 20 controls the pressure increasing device 7 and the injector 9 based on the crank angle t and the driving time and the fuel injection time of the pressure increasing device 7 set in step S208. In step S212, the electronic control unit 20 measures the fuel injection pressure Pinj(t) using the injection pressure sensor 91, and stores the measured fuel injection pressure Pinj(t).

In step S213, the electronic control unit 20 determines whether or not the fuel injection has ended based on the injection end time τfin indicating the end time of fuel injection. In a case where the electronic control unit 20 can determine that the fuel injection has ended since the crank angle t is larger than the injection end time τfin, the process proceeds to step S214. In a case where the electronic control unit 20 can determine that the fuel injection is continued since the crank angle t is equal to or less than the injection end time τfin, the processing of this routine ends.

In step S214, the electronic control unit 20 resets the injection setting flag Fset since the fuel injection has ended, so that the setting of fuel injection is performed in the next fuel injection. In step S215, since the measurement and storage of the fuel injection pressure Pinj(t) have ended, the electronic control unit 20 sets the injection measurement flag Finj.

In step S216, the electronic control unit 20 sets the fuel injection pressure Pinj(t) and then clears the number of times of fuel injection while the idle operation state is maintained (hereinafter, referred to as "idle maintenance number Nwait"). In the present embodiment, after measuring the fuel injection pressure Pinj(t), the fuel pressure in the injector 9 in the case of driving the pressure increasing device 7 without injecting fuel is measured. However, immediately after measuring the fuel injection pressure Pinj(t), the fuel pressure in the common rail 5 decreases. For this reason, the fuel pressure in the injector 9 in the case of driving the pressure increasing device 7 without injecting fuel may not be able to be correctly measured. In the present embodiment, some time after the measurement of the fuel injection pressure Pinj(t) in step S212, the fuel pressure in the injector 9 in the case of driving the pressure increasing device 7 without injecting fuel is measured. The idle maintenance number Nwait used in step S216 is a variable prepared for measuring the elapsed time after measuring the fuel injection pressure Pinj(t), and is incremented each time fuel is injected while the idle operation state is maintained. When the processing of step S216 ends, the electronic control unit 20 ends the processing of this routine.

In step S217, in order to determine whether or not a sufficient time has passed after measuring the fuel injection pressure Pinj(t), the electronic control unit 20 determines whether or not the idle maintenance number Nwait is less than the maximum idle maintenance number Nwmax that is a predetermined constant. In a case where the idle maintenance number Nwait is less than the maximum idle maintenance number Nwmax, the electronic control unit 20 determines that a sufficient time has not passed after measuring the fuel injection pressure Pinj(t), and proceeds to step S218. In a case where the idle maintenance number Nwait is equal to or greater than the maximum idle maintenance number Nwmax, the electronic control unit 20 determines that a sufficient time has passed after measuring the fuel injection pressure Pinj(t), and proceeds to step S226 to measure the fuel pressure in the injector 9 in a case where no fuel is injected.

In step S218, the electronic control unit 20 determines whether or not the injection setting flag Fset is in the reset state. In a case where the injection setting flag Fset is in the reset state, the process proceeds to step S219 to set the fuel injection. In a case where the injection setting flag Fset is in the set state, the setting of fuel injection is omitted and the process proceeds to step S221.

In step S219, the electronic control unit 20 sets the fuel injection for performing the idle operation. That is, the electronic control unit 20 calculates the request injection amount Qv for maintaining the idle operation, and sets the fuel injection time and the target common rail pressure Pcr_t corresponding to the request injection amount Qv. In a case where the idle operation is maintained, the request injection amount Qv is relatively small. Therefore, the supply pump 3 and the injector 9 are controlled without increasing the fuel pressure using the pressure increasing device 7. When the electronic control unit 20 executes the setting of fuel injection in step S219, the electronic control unit 20 sets the injection setting flag Fset in step S220.

In step S221, the electronic control unit 20 measures the crank angle t. Then, in step S222, the electronic control unit 20 injects fuel based on the time set in step S219 and the crank angle t. By the fuel injection in step S219, the idle operation is maintained in the internal combustion engine 100.

In step S223, the electronic control unit 20 determines whether or not the crank angle t is larger than the injection end time τfin in order to determine whether or not the fuel injection has ended. In a case where the crank angle t is larger than the injection end time τfin, the injection setting flag Fset is reset in step S224, and then the idle maintenance number Nwait is incremented in step S225 and the processing of this routine ends. In a case where the crank angle t is equal to or less than the injection end time τfin, the electronic control unit 20 determines that the fuel injection is continuing, and ends the processing of this routine.

In step S226, the electronic control unit 20 determines whether or not the injection setting flag Fset is in the reset state. In a case where the injection setting flag Fset is in the reset state, the electronic control unit 20 proceeds to step S227 to set the fuel injection. In a case where the injection setting flag Fset is in the set state, the electronic control unit 20 omits the setting of fuel injection, and proceeds to step S229.

In step S227, the electronic control unit 20 drives the pressure increasing device 7 at a time corresponding to the point Nlearn, and sets the driving time of the pressure increasing device 7 so as not to inject fuel. Hereinafter, the fuel pressure increase for updating the correction value K will be referred to as "learning pressure increase". In step S228, the electronic control unit 20 sets the injection setting flag Fset since the setting of fuel pressure increase has ended.

In step S229, the electronic control unit 20 measures the crank angle t. Then, in step S230, the electronic control unit 20 injects the fuel based on the time set in step S227 and the crank angle t. In step S231, the electronic control unit 20 measures the fuel pressure in the injector 9, and stores the measured pressure. Hereinafter, the fuel pressure detected by the injection pressure sensor 91 in the case of increasing the fuel pressure without injecting the fuel when the crank angle is t will be referred to as "non-injection pressure Pinj_0(t)".

In step S232, the electronic control unit 20 determines whether or not the crank angle t is larger than the injection end time τfin. In a case where the crank angle t is larger than the injection end time τfin, the electronic control unit 20 proceeds to step S233 to update the correction value K. In a case where the crank angle t is equal to or less than the injection end time τfin, the electronic control unit 20 determines that the fuel injection is continuing, and ends the processing of this routine.

In step S233, the electronic control unit 20 resets the injection setting flag Fset since the fuel injection has ended. Then, in step S234, the electronic control unit 20 updates the correction value K. Step S234 will be described later with reference to FIG. 17. In step S235, the electronic control unit 20 resets the injection measurement flag Finj to return to the initial state.

In step S236, the electronic control unit 20 increments the point Nlearn since the updating of the correction value K at the point Nlearn has ended. That is, when this routine is called next, another learning point is selected in step S207. Then, in step S237, the electronic control unit 20 determines whether or not the point Nlearn is larger than the total number of learning points Nlmax. For example, in the present embodiment, since there are a total of five learning points from a to e, the total number of learning points Nlmax is 5. Since the case where the point Nlearn is larger than the total number of learning points Nlmax in step S237 means that the updating of the correction value K at all the learning points has ended, the point Nlearn is set to one in step S238 to return to the initial state, and this routine is ended. In a case where the point Nlearn is equal to or less than the total number of learning points Nlmax in step S237, the electronic control unit 20 determines that a learning point for which the updating of the correction value K has not ended remains, and ends the processing of this routine.

Figure 17:
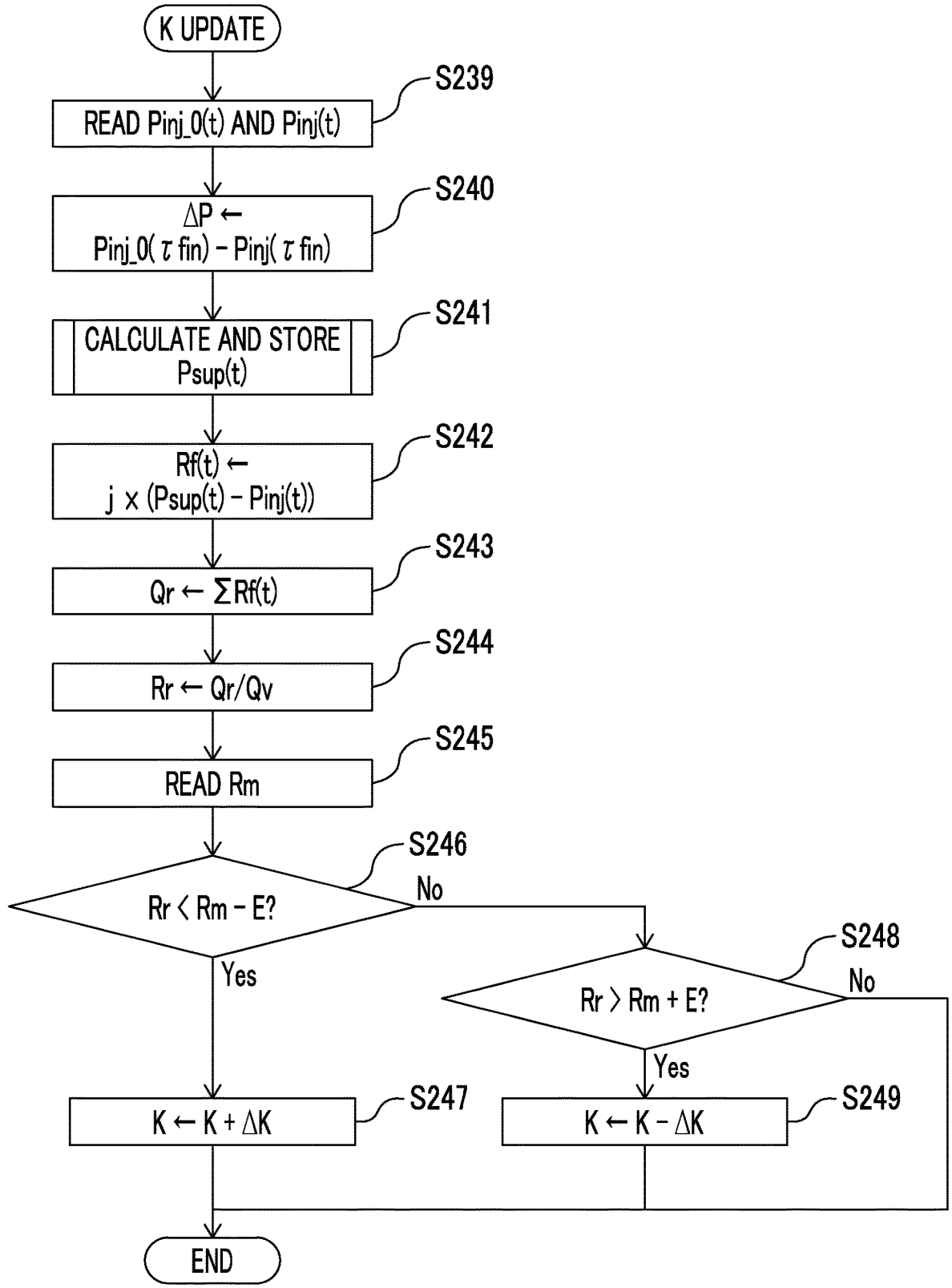
FIG. 17 is a flowchart showing a routine for updating a correction value in the second embodiment.

Finally, the control for updating the correction value K in the second embodiment of the present disclosure will be described. FIG. 17 is a flowchart showing a routine for updating the correction value K in the second embodiment of the present disclosure. The routine of FIG. 17 is called each time step S234 in the flowchart of FIG. 16 is executed.

In step S239, the electronic control unit 20 reads the non-injection pressure Pinj_0(t) stored in step S231 and the fuel injection pressure Pinj(t) stored in step S212. That is, the waveforms of the non-injection pressure Pinj_0 and the fuel injection pressure Pinj are read.

In step S240, the electronic control unit 20 calculates a differential pressure between the fuel injection pressure Pinj and the non-injection pressure Pinj_0 when the fuel injection has ended, in order to calculate an injection differential pressure $\Delta P$ that is a pressure decrease in the common rail pressure Pcr caused by fuel injection. That is, $\Delta P$=Pinj_0($\tau$fin)−Pinj($\tau$fin) (refer to FIG. 7).

In step S241, the electronic control unit 20 calculates the supply pressure Psup(t) by correcting the non-injection pressure Pinj_0(t) based on the injection differential pressure $\Delta P$. Since the method of calculating the supply pressure Psup in the present embodiment has been described above, the description will be omitted herein. In the present embodiment, the electronic control unit 20 stores the supply pressure Psup(t) for use in step S242 during normal injection.

In step S242, the electronic control unit 20 calculates the fuel injection rate Rf(t) based on the supply pressure Psup(t). In step S243, the electronic control unit 20 calculates the measured fuel injection amount Qr by integrating the fuel injection rate Rf(t) with respect to time.

In step S244, the electronic control unit 20 calculates a measured increase ratio Rr that is a ratio between the request injection amount Qv and the measured fuel injection amount Qr. In the present embodiment, since the internal combustion engine 100 is in the idle operation, the pressure increasing device 7 is normally not driven. Therefore, the request injection amount Qv during the idle operation is the fuel injection amount in a case where fuel is injected without driving the pressure increasing device 7. On the other hand, the measured fuel injection amount Qr calculated in step S243 is the fuel injection amount in a case where fuel is injected while driving the pressure increasing device 7. That is, since the assumption relevant to the driving of the pressure increasing device 7 is different, the error of the measured fuel injection amount Qr cannot be calculated by directly comparing the request injection amount Qv and the measured fuel injection amount Qr with each other. Accordingly, in the present embodiment, the error of the measured fuel injection amount Qr is calculated by comparing the increase ratio of the fuel injection amount Q, which is a ratio between the fuel injection amount in a case where the pressure increasing device 7 is not driven and the fuel injection amount in a case where the pressure increasing device 7 is driven, with a stored increase ratio. In step S244, the electronic control unit 20 calculates the ratio between the request injection amount Qv and the measured fuel injection amount Qr, and the ratio between the request injection amount Qv and the measured fuel injection amount Qr is referred to as the "measured increase ratio Rr".

In step S245, the electronic control unit 20 reads a stored increase ratio Rm that is an increase ratio of the fuel pressure caused by driving the pressure increasing device 7 and that is stored for each learning point.

In step S246, the electronic control unit 20 determines whether or not the measured increase ratio Rr is smaller than the difference between the stored increase ratio Rm and a predetermined allowable range E. In a case where the measured increase ratio Rr is smaller than the difference between the stored increase ratio Rm and the allowable range E, the electronic control unit 20 determines that correction is needed since the measured fuel injection amount Qr is smaller than the stored fuel injection amount Qm, and proceeds to step S247. In a case where the measured increase ratio Rr is equal to or greater than the difference between the stored increase ratio Rm and the allowable range E, the process proceeds to step S248.

In step S247, the electronic control unit 20 performs a correction to increase the correction value K. In the present embodiment, as described above, time $\tau$en at which the injection signal is switched from ON to OFF is corrected by the correction value K. "Electronic control unit 20 increases the correction value K" means that $\tau$en increases, that is, the measured fuel injection amount Qr increases. Therefore, by increasing the correction value K, the measured fuel injection amount Qr can be made close to the stored fuel injection amount Qm. In the present embodiment, the correction value K is increased by $\Delta K$. In the present embodiment, the value of $\Delta K$ is a predetermined value. When the processing of step S247 ends, the electronic control unit 20 ends this routine.

In step S248, the electronic control unit 20 determines whether or not the measured increase ratio Rr is larger than the total value of the stored increase ratio Rm and the allowable range E. In a case where the measured increase ratio Rr is larger than the total value of the stored increase ratio Rm and the allowable range E, the electronic control unit 20 determines that correction is needed since the measured fuel injection amount Qr is larger than the stored fuel injection amount Qm, and proceeds to step S249. In a case where the measured increase ratio Rr is equal to or less than the total value of the stored increase ratio Rm and the allowable range E, the electronic control unit 20 determines that no correction is needed, and ends the processing of this routine.

In step S249, the electronic control unit 20 performs a correction to decrease the correction value K. "Electronic control unit 20 decreases the correction value K" means that $\tau$en decreases, that is, the measured fuel injection amount Qr decreases. Therefore, by decreasing the correction value K, the measured fuel injection amount Qr can be made close to the stored fuel injection amount Qm. In the present embodiment, the correction value K is decreased by $\Delta K$. In the present embodiment, the value of $\Delta K$ is a predetermined value. When the processing of step S249 ends, the electronic control unit 20 ends this routine.

The electronic control unit 20 in the present embodiment described above switches the injection signal from OFF to ON in order to inject fuel from the injector 9 (fuel injector), and switches the injection signal from ON to OFF in order to stop the injection of fuel from the injector 9 (fuel injector). The electronic control unit 20 switches the pressure increase signal from OFF to ON in order to make the pressure increasing device 7 increase the fuel pressure, and switches the pressure increase signal from ON to OFF in order to stop the pressure increasing device 7 from increasing the fuel pressure. The time difference between time $\tau$st at which the injection signal is switched from OFF to ON and time Tst at which the pressure increase signal is switched from OFF to ON is referred to as a start time difference $\Delta$tst, and the time difference between time $\tau$en at which the injection signal is switched from ON to OFF and time Ten at which the pressure increase signal is switched from ON to OFF is referred to as an end time difference $\Delta$ten. In this case, according to the second embodiment of the present disclosure, the electronic control unit 20 stores the stored fuel injection amount Qm and the correction value K for each of the common rail pressure Pcr (pressure of fuel supplied to the pressure increasing device 7), the start time difference $\Delta$tst, and the end time difference $\Delta$ten. The electronic control unit 20 (control device for an internal combustion engine) calculates the measured fuel injection amount Qr (actual fuel injection amount) for each of the common rail pressure Pcr (pressure of fuel supplied to the pressure increasing device 7), the start time difference Δtst, and the end time difference Δten. The electronic control unit 20 updates the correction value K based on the calculated measured fuel injection amount Qr (actual fuel injection amount) and the stored fuel injection amount Qm.

In the second embodiment described above, even when the characteristics of the pressure increasing device 7 or the like change, a reduction in control accuracy can be further suppressed by updating the correction value K.

In the second embodiment of the present disclosure, the correction value K is the correction value K, for correcting time τen at which the injection signal is switched from ON to OFF. By correcting time τen at which the fuel injection ends, the time to supply fuel can be directly corrected. Therefore, compared with a case where a pressure increase period (Tst or Ten) is controlled, the control accuracy is improved in that the fuel supply amount can be directly controlled. In addition, compared with a case of correcting time τst at which the fuel injection starts, the influence on the fuel consumption can be reduced by correcting time τen at which the fuel injection ends.

In the second embodiment of the present disclosure, the electronic control unit 20 measures the non-injection pressure $Pinj\_0(t)$ and the fuel injection pressure $Pinj(t)$ (injection pressure) when the internal combustion engine 100 is in the idle operation state. The correction value K is updated based on the difference between the measured fuel injection pressure $Pinj(t)$ (injection pressure) and the measured non-injection pressure $Pinj\_0(t)$. In the idle operation state, fuel injection and fuel pressure increase for updating the correction value K can be performed without affecting the traveling of the vehicle.

Third Embodiment

A third embodiment of the present disclosure will be described. The third embodiment of the present disclosure is different from the second embodiment in that the correction value K is updated solely when the internal combustion engine 100 is in the idle operation state in the second embodiment but the correction value K is updated even when the internal combustion engine 100 is not in the idle operation state in the third embodiment. Hereinafter, the description of portions overlapping those in the second embodiment will be omitted.

Figure 18:
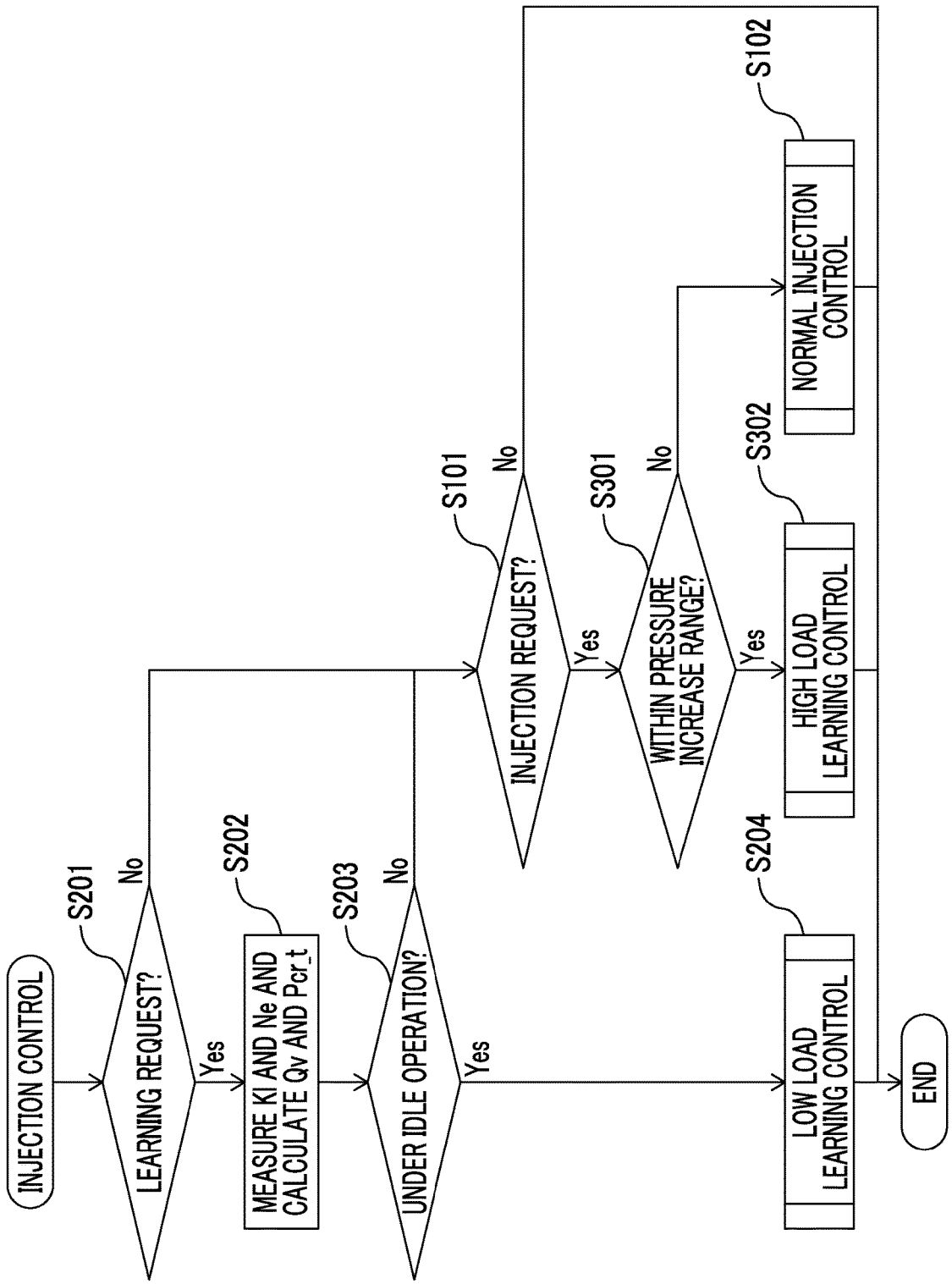
FIG. 18 is a flowchart showing a routine for performing fuel injection in a third embodiment.

FIG. 18 is a flowchart showing a routine of fuel injection control in the third embodiment of the present disclosure. In the third embodiment, the electronic control unit 20 executes this routine instead of the routine shown in FIG. 14 in the second embodiment. The electronic control unit 20 repeatedly executes this flowchart at fixed periods.

Since steps S201 and S202 are the same as those in the second embodiment, the description will be omitted. In step S203, the electronic control unit 20 determines whether or not the internal combustion engine 100 is in the idle operation state. In a case where the internal combustion engine 100 is in the idle operation state, the process proceeds to step S204 to update the correction value K in a region where the engine load Kl is low. When, the electronic control unit 20 ends the processing of step S204, the processing of this routine ends. In a case where the electronic control unit 20 determines that the internal combustion engine 100 is not in the idle operation state in step S203, the electronic control unit 20 determines whether or not there is an injection request in step S101. In a case where there is an injection request, the process proceeds to step S301 to determine whether or not the current region is a region where the pressure increasing device 7 is driven.

In step S301, the electronic control unit 20 determines whether or not the operation state of the internal combustion engine 100, that is, the engine speed Ne and the request injection amount Qv, are included in a region where the pressure increasing device 7 is used. In the present embodiment, in a case where the engine speed Ne and the request injection amount Qv are included in the hatched region of FIG. 13, the electronic control unit 20 determines that the pressure increasing device 7 is to be driven using a map such as that shown in FIG. 13. In a case where the electronic control unit 20 drives the pressure increasing device 7, the process proceeds to step S302 to measure the fuel injection pressure Pinj at the time of pressure increase. In a case where the electronic control unit 20 does not drive the pressure increasing device 7, the electronic control unit 20 determines that driving the pressure increasing device 7 in order to update the correction value K is not possible, and performs normal control in step S102.

In step S302, the electronic control unit 20 performs learning control for updating the correction value K in a region where the engine load Kl is relatively high. In particular, since step S302 is executed when the engine load Kl is relatively high, step S302 is referred to as "high load learning control". Details of step S302 will be described below with reference to FIG. 19. When the electronic control unit 20 ends the processing of step S302, the processing of this routine ends.

Figure 19:
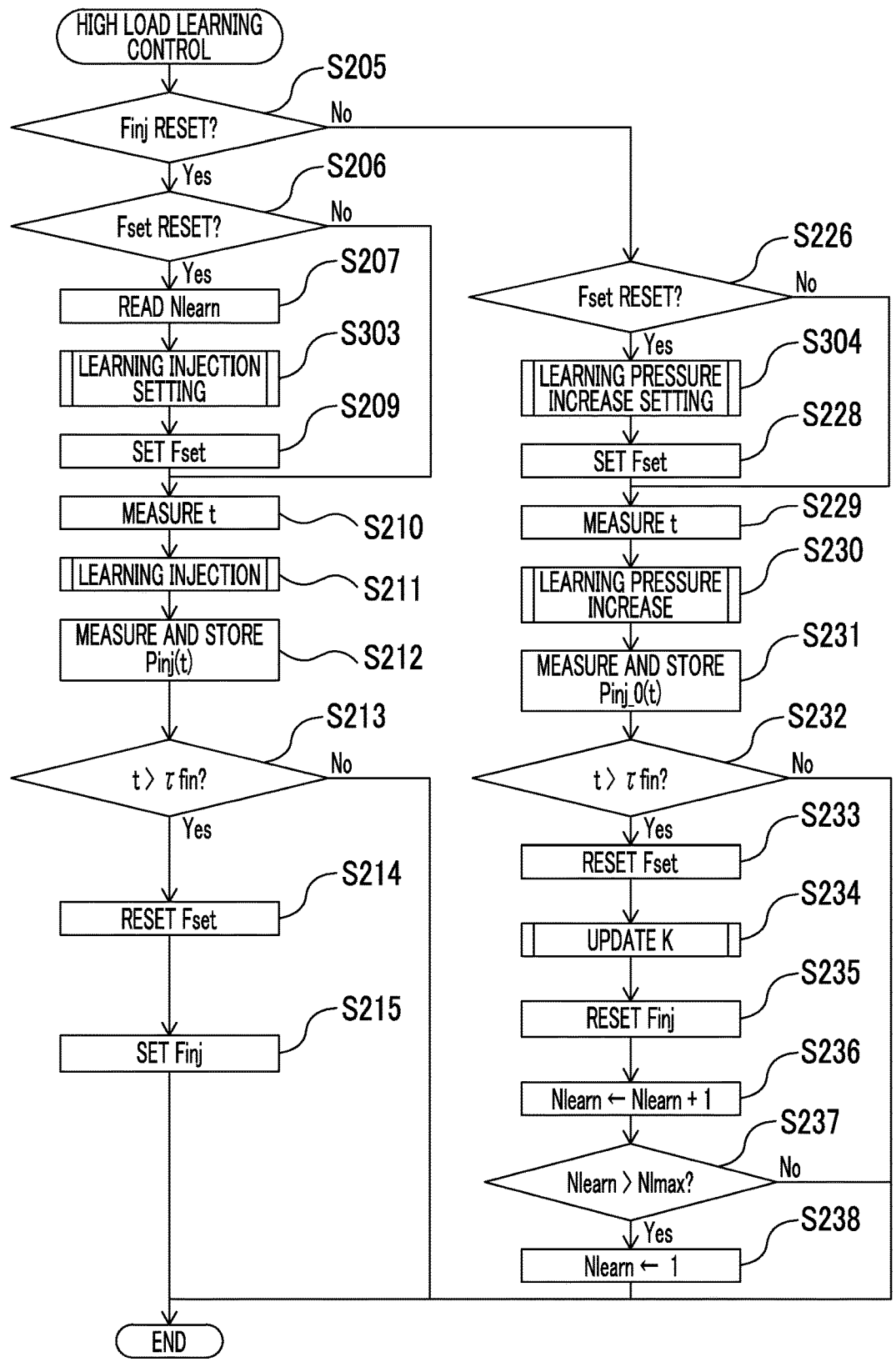
FIG. 19 is a flowchart showing a routine for performing high load learning control in the third embodiment.

FIG. 19 is a flowchart showing a routine of high load learning control in the third embodiment of the present disclosure. The flowchart of FIG. 19 is called each time step S302 in the flowchart of FIG. 18 is executed.

In step S205, in order to update the correction value K, the electronic control unit 20 determines whether or not the injection measurement flag Finj, which is set in a case where the fuel injection pressure Pinj at a predetermined learning point is measured, is in the reset state. In a case where the injection measurement flag Finj is in the reset state, the process proceeds to step S206 to measure the fuel injection pressure Pinj. In a case where the injection measurement flag Finj is in the set state, the process proceeds to step S226 to measure the non-injection pressure Pinj_0.

When the injection setting flag Fset is in the reset state in step S206, the electronic control unit 20 proceeds to step S207 to read the point Nlearn, and sets fuel injection in step S303. Fuel should be injected at a time corresponding to the learning point, read in step S207 to drive the pressure increasing device 7. By driving the pressure increasing device 7, the fuel pressure is increased to α (pressure increase ratio) times. Therefore, as a result of the increase in the fuel pressure in the common rail 5 to α (pressure increase ratio) times, the electronic control unit 20 sets the target common rail pressure Pcr_t so that the fuel of target pressure is supplied to the injector 9. When the fuel injection setting ends, the electronic control unit 20 sets the injection setting flag Fset indicating that the setting of injection has ended in step S303. Since steps S209 to S215 are the same as those in the second embodiment, the description will be omitted.

In a case where the injection setting flag Fset is in the reset state in step S226, the process proceeds to step S304 to set a time at which the pressure increasing device 7 is driven. In step S304, the electronic control unit 20 sets a time at which the pressure increase signal is turned on and a time at which the pressure increase signal is turned off so that the pressure increasing device 7 is driven without injecting fuel. Incidentally, in the third embodiment, since the vehicle is traveling, the output of the vehicle may be reduced to affect the traveling of the vehicle in the case of driving the pressure increasing device 7 without injecting fuel at the time at which fuel should be injected. Therefore, in the present embodiment, in step S304, the pressure increasing device 7 is driven when the crank angle t is at the opposite phase to the time at which fuel injection is originally performed in order to reduce the influence of the driving of the pressure increasing device 7 on the vehicle. In this manner, by the next fuel injection, the common rail pressure Pcr and the fuel injection pressure Pinj return to normal values, so that the influence on the vehicle can be suppressed.

In particular, in the present embodiment, the pressure increase time of the pressure increasing device 7 for measuring the non-injection pressure Pinj_0(t) is matched with the time at which fuel in a cylinder having the opposite phase is injected. When the electronic control unit 20 ends the setting in step S304, the process proceeds to step S228. Since the description of steps S228 to S233 is the same as that in the second embodiment, the description will be omitted.

When the electronic control unit 20 determines that the crank angle t is larger than the injection end time τfin in step S232, the process proceeds to step S233 to reset the injection setting flag Fset. Then, the process proceeds to step S234.

In step S234, the electronic control unit 20 updates the correction value K. Since the method of updating the correction value K in the third embodiment is different from the method of updating the correction value K in the second embodiment, the method of updating the correction value K in the third embodiment will be described later using a flowchart. Since the description of steps until step S234 and steps S235 to S238 is the same as that in the second embodiment, the description will be omitted.

Figure 20:
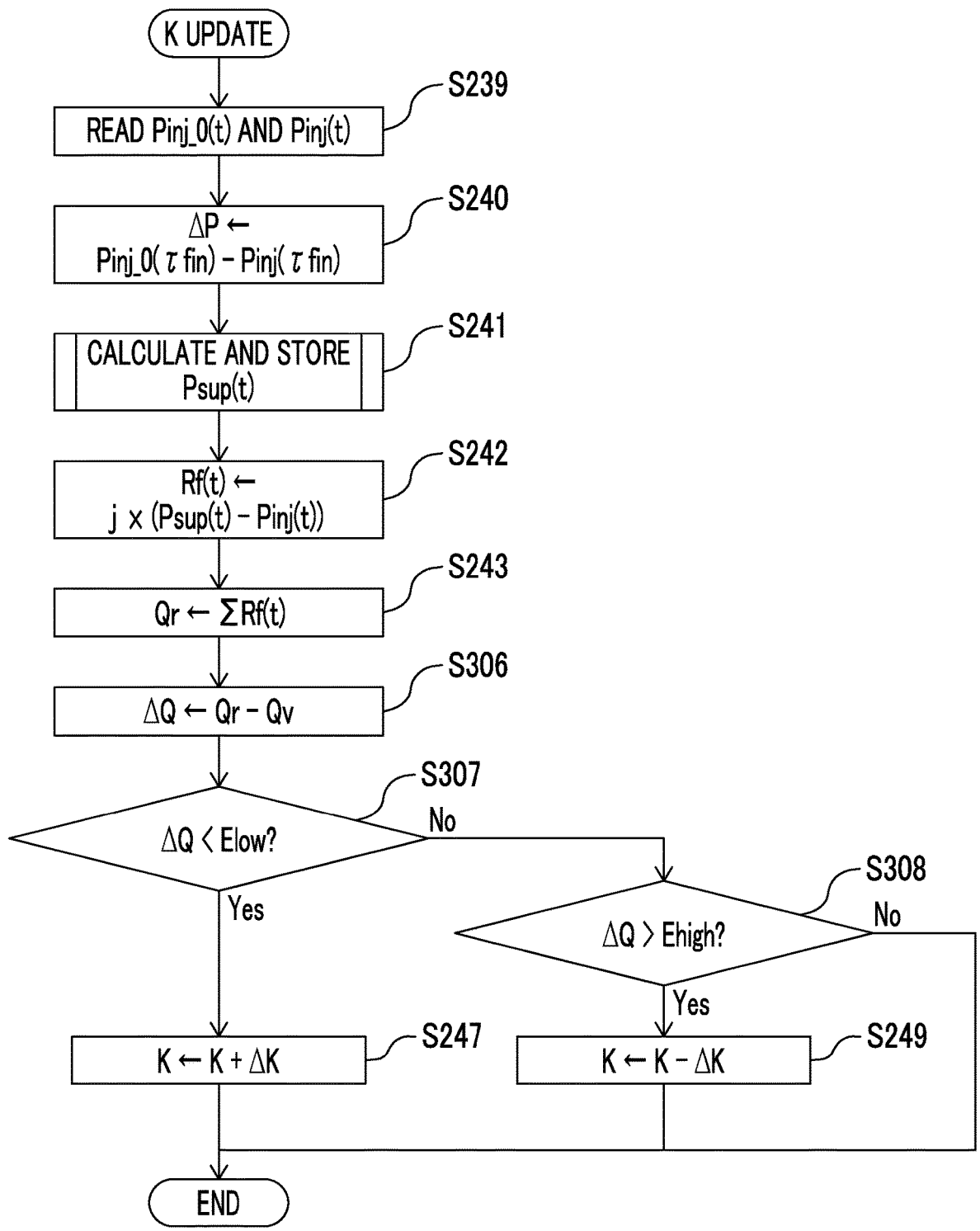
FIG. 20 is a flowchart showing a routine for updating a correction value in the third embodiment.

FIG. 20 is a flowchart showing a routine for updating the correction value K in the third embodiment of the present disclosure. The routine of FIG. 20 is called each time step S305 in the flowchart of FIG. 19 is executed.

In steps S239 to S243, the electronic control unit 20 calculates the measured fuel injection amount Qr in the same manner as in the second embodiment, and proceeds to step S306.

In step S306, a difference between the measured fuel injection amount Qr and the stored fuel injection amount Qm is calculated. Hereinafter, the difference between the measured fuel injection amount Qr and the stored fuel injection amount Qm will be referred to as "injection amount error ΔQ". Incidentally, in the present embodiment, since both the stored fuel injection amount Qm and the request injection amount Qv are fuel injection amounts in the case of injecting fuel while driving the pressure increasing device 7, the stored fuel injection amount Qm and the request injection amount Qv are the same. Therefore, in step S306, the electronic control unit 20 may set the difference between the measured fuel injection amount Qr and the request injection amount Qv as the injection amount error ΔQ.

In step S307, the electronic control unit 20 determines whether or not the injection amount error ΔQ is smaller than a predetermined lower limit value (hereinafter, referred to as an "allowable lower limit value Elow"). In a case where the injection amount error ΔQ is smaller than the allowable lower limit value Elow, the electronic control unit 20 determines that correction is needed since the measured fuel injection amount Qr is smaller than the stored fuel injection amount Qm, proceeds to step S247 to increase the correction value K, and ends this routine. In a case where the injection amount error ΔQ is equal to or greater than the allowable lower limit value Elow, the process proceeds to step S308.

In step S308, the electronic control unit 20 determines, whether or not the injection amount error ΔQ is larger than a predetermined upper limit value (hereinafter, referred to as an "allowable upper limit value Ehigh"). In a case where the injection amount error ΔQ is larger than the allowable upper limit value Ehigh, the electronic control unit 20 determines that correction is needed since the measured fuel injection amount Qr is larger than the stored fuel injection amount Qm, proceeds to step S249 to decrease the correction value K, and ends this routine. In a case where the injection amount error ΔQ is equal to or less than the allowable upper limit value Ehigh, the electronic control unit 20 determines that no correction is needed, and ends the processing of this routine.

As described above, in the third embodiment of the present disclosure, the correction value K can be updated by driving the pressure increasing device 7 without injecting fuel during normal traveling.

As described above, in the third embodiment of the present disclosure, the electronic control unit 20 measures the fuel injection pressure Pinj(t) (injection pressure) by injecting fuel while driving the pressure increasing device 7 when the internal combustion engine 100 is in the operation state in which the pressure increasing device 7 can be used. The electronic control unit 20 measures the non-injection pressure Pinj_0(t) by driving the pressure increasing device 7 without injecting fuel at the time at which the injector 9 (fuel injector) does not inject fuel. The electronic control unit 20 updates the correction value K based on the non-injection pressure Pinj_0(t) and the fuel injection pressure Pinj(t) (injection pressure). In the third embodiment described above, the correction value K in a region where the engine load Kl is relatively high can be updated without interrupting the traveling of the vehicle.

In the second and third embodiments, the correction value K is recorded for the five learning points of the learning points a to e. However, for a point not corresponding to each learning point, the correction value K can be calculated by interpolating the correction value K at the learning point that has already been made clear.

In the second and third embodiments, the correction value K is stored in a region where the engine loads Kl is different. When the load is between the engine load Kl of the second embodiment and the engine load Kl of the third embodiment, the correction value K is not stored. However, the correction value K can be calculated by interpolating the correction value K obtained in the second embodiment and the correction value K obtained in the third embodiment.

In the present embodiment, the correction value K is corrected for a single cylinder. However, in a case where the internal combustion engine 100 has a plurality of cylinders, the correction value K may be stored separately for each cylinder since the characteristics of the pressure increasing device 7 may be different for each cylinder.

In the present embodiment, the correction value K is corrected by calculating the measured increase ratio Rr as shown in FIG. 17. However, the correction value K may be corrected based on the error between the measured fuel injection amount Qr and the stored fuel injection amount Qm.

What is claimed is:
1. A control device for an internal combustion engine, the control device comprising:
   a fuel injector configured to inject fuel;

a pressure increasing device that is provided upstream of the fuel injector and is configured to increase a pressure of fuel supplied to the fuel injector; and an electronic control unit configured to calculate an actual fuel injection amount based on a difference between a first fuel pressure in the fuel injector when the pressure increasing device increases the fuel pressure without fuel injection by the fuel injector and a second fuel pressure in the fuel injector when the fuel injector performs fuel injection while driving of the pressure increasing device, wherein:

the electronic control unit is configured to store in advance a stored fuel injection amount that is a fuel injection amount determined based on the pressure of fuel supplied to the pressure increasing device, a fuel injection time of the fuel injector, and a pressure increase time of the pressure increasing device; and the electronic control unit is configured to correct at least one of the fuel injection time and the pressure increase time using a correction value such that the actual fuel injection amount and the stored fuel injection amount are made close to each other and control the fuel injector based on the corrected fuel injection time or control the pressure increasing device based on the corrected pressure increase time.

2. The control device according to claim 1, wherein:

the electronic control unit is configured to switch an injection signal from OFF to ON to inject fuel from the fuel injector, switch the injection signal from ON to OFF to stop injection of fuel from the fuel injector, switch a pressure increase signal from OFF to ON to control the pressure increasing, device to increase the pressure of the fuel, and switch the pressure increase signal from ON to OFF to control the pressure increasing device to stop increasing the fuel pressure;

the electronic control unit is configured to store the stored fuel injection amount and the correction value for each of the pressure of fuel supplied to the pressure increasing device, a start time difference, and an end time difference, calculate the actual fuel injection amount for each of the pressure of fuel supplied to the pressure increasing device, the start time difference, and the end time difference, and update the correction value based on the calculated actual fuel injection amount and the stored fuel injection amount;

the start time difference is a time difference between a time at which the injection signal is switched from OFF to ON and a time at which the pressure increase signal is switched from OFF to ON; and the end time difference is a time difference between a time at which the injection signal is switched from ON to OFF and a time at which the pressure increase signal is switched from ON to OFF.

3. The control device according to claim 2, wherein the correction value corrects the time at which the injection signal is switched from ON to OFF.

4. The control device according to claim 1, wherein the electronic control unit is configured to measure the first fuel pressure and the second fuel pressure when the internal combustion engine is in an idle operation state and update the correction value based on a difference between the measured first fuel pressure and the measured second fuel pressure.

5. The control device according to claim 1, wherein:

the electronic control unit is configured to measure the second fuel pressure when the fuel injector performs fuel injection while driving the pressure increasing device when the internal combustion engine is in an operation state in which the pressure increasing device is available;

the electronic control unit is configured to measure the first pressure when the pressure increasing device increases the fuel pressure without fuel injection by the fuel injector at a time at which the fuel injector does not inject fuel; and the electronic control unit is configured to update the correction value based on the first fuel pressure and the second fuel pressure.

6. A control device for an internal combustion engine, the control device comprising:

a fuel injector configured to inject fuel;

a pressure increasing device that is provided upstream of the fuel injector, the pressure increasing device includes a piston, the pressure increasing device configured to increase a pressure of fuel supplied to the fuel injector; and an electronic control unit configured to calculate an actual fuel injection amount based on a difference between a first fuel pressure in the fuel injector when the pressure increasing device increases the fuel pressure without fuel injection by the fuel injector and a second fuel pressure in the fuel injector when the fuel injector performs fuel injection while driving of the pressure increasing device, wherein:

the electronic control unit is configured to store in advance a stored fuel injection amount that is a fuel injection amount determined based on the pressure of fuel supplied to the pressure increasing device, a fuel injection time of the fuel injector, and a pressure increase time of the pressure increasing device; and the electronic control unit is configured to correct at least one of the fuel injection time and the pressure increase time using a correction value such that the actual fuel injection amount and the stored fuel injection amount are made close to each other and control the fuel injector based on the corrected fuel injection time or control the pressure increasing device based on the corrected pressure increase time.

7. The control device according to claim 6, wherein:

the electronic control unit is configured to switch an injection signal from OFF to ON to inject fuel from the fuel injector, switch the injection signal from ON to OFF to stop injection of fuel from the fuel injector, switch a pressure increase signal from OFF to ON to control the pressure increasing, device to increase the pressure of the fuel, and switch the pressure increase signal from ON to OFF to control the pressure increasing device to stop increasing the fuel pressure;

the electronic control unit is configured to store the stored fuel injection amount and the correction value for each of the pressure of fuel supplied to the pressure increasing device, a start time difference, and an end time difference, calculate the actual fuel injection amount for each of the pressure of fuel supplied to the pressure increasing device, the start time difference, and the end time difference, and update the correction value based on the calculated actual fuel injection amount and the stored fuel injection amount;

the start time difference is a time difference between a time at which the injection signal is switched from OFF to ON and a time at which the pressure increase signal is switched from OFF to ON; and the end time difference is a time difference between a time at which the injection signal is switched from ON to OFF and a time at which the pressure increase signal is switched from ON to OFF.

8. The control device according to claim 7, wherein the correction value corrects the time at which the injection signal is switched from ON to OFF.

9. The control device according to claim 6, wherein the electronic control unit is configured to measure the first fuel pressure and the second fuel pressure when the internal combustion engine is in an idle operation state and update the correction value based on a difference between the measured first fuel pressure and the measured second fuel pressure.

10. The control device according to claim 6, wherein:
the electronic control unit is configured to measure the second fuel pressure when the fuel injector performs fuel injection while driving the pressure increasing device when the internal combustion engine is in an operation state in which the pressure increasing device is available;
the electronic control unit is configured to measure the first pressure when the pressure increasing device increases the fuel pressure without fuel injection by the fuel injector at a time at which the fuel injector does not inject fuel; and
the electronic control unit is configured to update the correction value based on the first fuel pressure and the second fuel pressure.

11. A control device for an internal combustion engine, the control device comprising:
a fuel injector configured to inject fuel;
a pressure increasing device that is provided upstream of the fuel injector, the pressure increasing device includes a housing, a piston moveable within the housing, and a spring positioned between the housing and the piston, and the pressure increasing device is configured to increase a pressure of fuel supplied to the fuel injector; and
an electronic control unit configured to calculate an actual fuel injection amount based on a difference between a first fuel pressure in the fuel injector when the pressure increasing device increases the fuel pressure without fuel injection by the fuel injector and a second fuel pressure in the fuel injector when the fuel injector performs fuel injection while driving of the pressure increasing device, wherein:
the electronic control unit is configured to store in advance a stored fuel injection amount that is a fuel injection amount determined based on the pressure of fuel supplied to the pressure increasing device, a fuel injection time of the fuel injector, and a pressure increase time of the pressure increasing device; and
the electronic control unit is configured to correct at least one of the fuel injection time and the pressure increase time using a correction value such that the actual fuel injection amount and the stored fuel injection amount are made close to each other and control the fuel injector based on the corrected fuel injection time or control the pressure increasing device based on the corrected pressure increase time.

12. The control device according to claim 11, wherein:
the electronic control unit is configured to switch an injection signal from OFF to ON to inject fuel from the fuel injector, switch the injection signal from ON to OFF to stop injection of fuel from the fuel injector, switch a pressure increase signal from OFF to ON to control the pressure increasing, device to increase the pressure of the fuel, and switch the pressure increase signal from ON to OFF to control the pressure increasing device to stop increasing the fuel pressure;
the electronic control unit is configured to store the stored fuel injection amount and the correction value for each of the pressure of fuel supplied to the pressure increasing device, a start time difference, and an end time difference, calculate the actual fuel injection amount for each of the pressure of fuel supplied to the pressure increasing device, the start time difference, and the end time difference, and update the correction value based on the calculated actual fuel injection amount and the stored fuel injection amount;
the start time difference is a time difference between a time at which the injection signal is switched from OFF to ON and a time at which the pressure increase signal is switched from OFF to ON; and
the end time difference is a time difference between a time at which the injection signal is switched from ON to OFF and a time at which the pressure increase signal is switched from ON to OFF.

13. The control device according to claim 12, wherein the correction value corrects the time at which the injection signal is switched from ON to OFF.

14. The control device according to claim 11, wherein the electronic control unit is configured to measure the first fuel pressure and the second fuel pressure when the internal combustion engine is in an idle operation state and update the correction value based on a difference between the measured first fuel pressure and the measured second fuel pressure.

15. The control device according to claim 11, wherein:
the electronic control unit is configured to measure the second fuel pressure when the fuel injector performs fuel injection while driving the pressure increasing device when the internal combustion engine is in an operation state in which the pressure increasing device is available;
the electronic control unit is configured to measure the first pressure when the pressure increasing device increases the fuel pressure without fuel injection by the fuel injector at a time at which the fuel injector does not inject fuel; and
the electronic control unit is configured to update the correction value based on the first fuel pressure and the second fuel pressure.

\* \* \* \* \*

UNITED STATES PATENT AND TRADEMARK OFFICE
CERTIFICATE OF CORRECTION

PATENT NO. : 10,968,850 B2
APPLICATION NO. : 15/938519
DATED : April 6, 2021
INVENTOR(S) : Takahiro Hirano and Mao Hosoda It is certified that error appears in the above-identified patent and that said Letters Patent is hereby corrected as shown below:

In the Specification

In Column 02, Line(s) 58, delete "perforating" and insert --performing--, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*